United States Patent
Maltsev et al.

(10) Patent No.: US 9,608,458 B2
(45) Date of Patent: Mar. 28, 2017

(54) BUCK PRE-CHARGER FOR SERIES-CONNECTED BATTERY MODULES

(71) Applicant: NEC ENERGY SOLUTIONS, INC., Westborough, MA (US)

(72) Inventors: Yevgeny Maltsev, Hudson, MA (US); Gregory Tremelling, Berlin, MA (US)

(73) Assignee: NEC Energy Solutons, Inc., Westborough, MA (US)

( * ) Notice: Subject to any disclaimer, the term of this patent is extended or adjusted under 35 U.S.C. 154(b) by 142 days.

(21) Appl. No.: 14/661,112

(22) Filed: Mar. 18, 2015

(65) Prior Publication Data

US 2016/0276848 A1 Sep. 22, 2016

(51) Int. Cl.
*H02J 7/00* (2006.01)

(52) U.S. Cl.
CPC .......... *H02J 7/0021* (2013.01); *H02J 7/0013* (2013.01); *H02J 7/0016* (2013.01); *H02J 7/0019* (2013.01); *H02J 7/0047* (2013.01); *H02J 7/0073* (2013.01); *H02J 7/0077* (2013.01)

(58) Field of Classification Search
CPC ...... H02J 7/0016; H02J 7/0019; H02J 7/0021; H02J 7/0013; H02J 7/0047; H02J 7/0073; H02J 7/0077
USPC .................................................. 320/107, 116
See application file for complete search history.

(56) References Cited

U.S. PATENT DOCUMENTS

| | | | |
|---|---|---|---|
| 2011/0309795 A1* | 12/2011 | Firehammer | H02J 7/0014 320/118 |
| 2013/0187605 A1* | 7/2013 | Potts | H02J 7/0052 320/112 |
| 2013/0214733 A1 | 8/2013 | Liang et al. | |

OTHER PUBLICATIONS

Notification and Transmittal of the International Search Report and the Written Opinion of the International Searching Authority for PCT/US2016/22744, "Buck Pre-Charger for Series-Connected Battery Modules", date of mailing Jun. 16, 2016.

* cited by examiner

*Primary Examiner* — Nathaniel Pelton
(74) *Attorney, Agent, or Firm* — Chapin Intellectual Property Law, LLC

(57) ABSTRACT

Systems and methods of pre-charging battery cells that can reliably pre-charge battery cells included in a plurality of series-connected battery modules. The systems and methods can monitor a value of a pre-charge current provided to the plurality of series-connected battery modules, as well as monitor a voltage level of the battery cells within each battery module. The systems and methods can further switchingly interrupt the pre-charge current within each battery module once it has reached a predetermined threshold current value or the battery cells within the battery module have been charged to a UVP level, causing a flyback current to flow into the battery cells of each battery module that have not yet been charged to the UVP level. Once the battery cells within each battery module have been charged to the UVP level, the systems and methods can provide a full-charge current to the plurality of series-connected battery modules.

20 Claims, 16 Drawing Sheets

BUCK PRE-CHARGER FOR SERIES-CONNECTED BATTERY MODULES

TECHNICAL FIELD

The present application relates generally to systems and methods of pre-charging battery modules, and more specifically to systems and methods of pre-charging a plurality of series-connected battery modules.

BACKGROUND

In recent years, rechargeable batteries have been increasingly employed in target applications ranging from laptop computers, smartphones, and other low power battery applications, to electrical grid, backup power, and other high power battery applications. For example, such rechargeable batteries can include rechargeable battery cells such as nickel-metal-hydride (NiMH) battery cells, lithium-ion (Li-ion) battery cells, etc. One or more such NiMH or Li-ion battery cells can be included in a battery module, which can further include a battery manager. Such a battery module can be employed in a stand-alone application, or a plurality of such battery modules can be connected in series for use in applications that require increased battery voltages.

When such NiMH or Li-ion battery cells have been discharged below a minimum voltage level needed for operation (also referred to herein as the "under voltage protection (UVP) voltage level"), the battery cells typically must be pre-charged at a low current before they can receive a full-charge current at a higher value. Various circuit configurations are known for providing a pre-charge current to one or more NiMH or Li-ion battery cells included in a battery module. However, there is a need for more reliable systems and methods of pre-charging battery cells such as NiMH or Li-ion battery cells that are included in a plurality of series-connected battery modules.

SUMMARY

In accordance with the present application, systems and methods of pre-charging battery cells are disclosed that can more reliably pre-charge one or more rechargeable battery cells included in each of a plurality of series-connected battery modules. The disclosed systems and methods can monitor a value of a pre-charge current provided to the plurality of series-connected battery modules, as well as monitor a voltage level of the battery cell(s) within each battery module. The disclosed systems and methods can also switchingly interrupt the pre-charge current within any one of the battery modules once the pre-charge current has ramped up to a first threshold current value or the battery cell(s) within the battery module have been charged to a minimum voltage level needed for operation (also referred to herein as the "under voltage protection (UVP) voltage level"), thereby causing a flyback current to flow into the battery cell(s) of each battery module that have not yet been charged to at least the UVP voltage level. Once the flyback current within any one of the battery modules has ramped down to a second threshold current value, the disclosed systems and methods can again allow the pre-charge current to be provided to the respective battery modules. In response to one or more cycles of the pre-charge current ramping up to the first threshold current value and one or more flyback currents ramping down to the second threshold current value, the disclosed systems and methods can alternate between interrupting the pre-charge current and allowing the pre-charge current to be provided to the respective battery modules, until the battery cell(s) of each battery module have been charged to at least the UVP voltage level. Once the battery cell(s) within all of the battery modules have been charged to at least the UVP voltage level, the disclosed systems and methods can provide a full-charge current to the plurality of series-connected battery modules.

In one aspect, a system for pre-charging battery cells included in a plurality of series-connected battery modules includes, within each battery module, one or more rechargeable battery cells, a buck pre-charging circuit, a discharge switch, a charge switch, a current sense resistor, and a battery manager. For example, the discharge switch can be a field effect transistor (also referred to herein as the "DFET switch") or any other suitable switch, and the charge switch can likewise be a field effect transistor (also referred to herein as the "CFET switch") or any other suitable switch. The buck pre-charging circuit includes a blocking diode, an inductor, a flyback diode, and a pre-charge switch, which can also be a field effect transistor (also referred to herein as the "PFET switch") or any other suitable switch. The battery manager includes a programmable microprocessor or microcontroller and its associated program and/or data memory, one or more circuit components for detecting, sensing, monitoring, or otherwise determining one or more battery cell conditions (such as voltage levels, current values, temperature levels, etc.), and an analog-to-digital (A-to-D) converter. The system can further include a battery charger that has a charging voltage source.

In one mode of operation, the plurality of battery modules are arranged in a series-connected configuration, and the charging voltage source is connected across the plurality of series-connected battery modules. Once the charging voltage source is connected across the plurality of series-connected battery modules, the system enters a pre-charging mode and operates, as follows. Within each battery module, the battery manager initially maintains each of the DFET and CFET switches in its opened or "OFF" state, and places the PFET switch in its closed or "ON" state, thereby allowing a pre-charge current to flow from the charging voltage source, successively through the series of connected battery modules, and ultimately back to the charging voltage source. Specifically, within each battery module, the pre-charge current flows into the battery cell(s), through each of the current sense resistor, the blocking diode, and the inductor, and across the closed PFET switch either to the next battery module in the series of connected battery modules, or, if the battery module is the last battery module in the series of connected battery modules, then back to the charging voltage source. Within each battery module, the battery manager detects, senses, monitors, or otherwise determines a value of the pre-charge current flowing through the current sense resistor, and detects, senses, monitors, or otherwise determines a voltage level of the battery cell(s). Once the battery manager within at least one of the battery modules determines that the pre-charge current has ramped up to the first threshold current value, the battery manager directs the PFET switch within the battery module to transition from its closed or "ON" state to its opened or "OFF" state. Once the PFET switch within the battery module has transitioned to its opened or "OFF" state, the flow of the pre-charge current from the charging voltage source is interrupted, and a flyback current is caused to flow, within each battery module, from the inductor, through the flyback diode, into the battery cell(s), and through both of the current sense resistor and the blocking diode back to the inductor of the battery module.

Within each battery module, the battery manager detects, senses, monitors, or otherwise determines a value of the flyback current flowing through the current sense resistor. In the event the battery manager within at least one of the battery modules determines that its flyback current has ramped down to the second threshold current value, the PFET switch that was previously directed to transition from its closed or "ON" state to its opened or "OFF" state is now directed to transition from its opened or "OFF" state back to its closed or "ON" state. Because the PFET switches within all of the battery modules are in their closed or "ON" state, the pre-charge current is again allowed to flow from the charging voltage source, successively through the series of connected battery modules, and ultimately back to the charging voltage source.

Within each battery module, the battery manager further detects, senses, monitors, or otherwise determines a value of the pre-charge current flowing through the current sense resistor, and further detects, senses, monitors, or otherwise determines a voltage level of the battery cell(s). Once the battery manager within at least one of the battery modules determines that the battery cell(s) within the battery module have been charged to at least the UVP voltage level, the battery manager directs the PFET switch within the battery module to transition from its closed or "ON" state to its opened or "OFF" state, and further directs each of the DFET and CFET switches within the battery module to transition from its opened or "OFF" state to its closed or "ON" state, thereby providing a bypass path around the opened PFET switch within the battery module.

In response to one or more cycles of the pre-charge current ramping up to the first threshold current value and one or more flyback currents ramping down to the second threshold current value, the battery modules can alternate between (1) allowing the pre-charge current to flow through the respective battery modules, and (2) interrupting the pre-charge current to cause a flyback current to flow into the battery cell(s) of each battery module that have not yet been charged to the UVP voltage level, until the battery cell(s) within all of the battery modules have been charged to at least the UVP voltage level.

Once the battery cells within all of the battery modules have been charged to at least the UVP voltage level, the system exits the pre-charging mode, enters a full-charging mode, and subsequently operates, as follows. Within each battery module, once each of the DFET and CFET switches has transitioned to its closed or "ON" state, a full-charge current is allowed to flow from the charging voltage source, successively through the series of connected battery modules, and ultimately back to the charging voltage source. Specifically, within each battery module, the full-charge current flows into the battery cell(s), and across both of the closed DFET and CFET switches either to the next battery module in the series of connected battery modules, or, if the battery module is the last battery module in the series of connected battery modules, then back to the charging voltage source. Within each battery module, the battery manager further detects, senses, monitors, or otherwise determines the voltage level of the battery cell(s). Once the battery manager within each battery module determines that the battery cell(s) are adequately charged based at least on the voltage level of the battery cell(s), the battery manager can direct each of the DFET and CFET switches within the battery module to transition from its closed or "ON" state to its opened or "OFF" state to interrupt the full-charge current, and the system can exit the full-charging mode.

By (1) allowing a pre-charge current to flow into one or more rechargeable battery cells within each of a plurality of series-connected battery modules, (2) interrupting the pre-charge current upon its ramping up to a first threshold current value, thereby causing a flyback current to flow into the battery cell(s) of each battery module, (3) once the flyback current within at least one of the battery modules has ramped down to a second threshold current value, allowing the pre-charge current to flow again into the battery cell(s) of the respective battery modules, (4) alternating between allowing the pre-charge current to flow into the battery cell(s) of the respective battery modules and interrupting the pre-charge current to cause a flyback current to flow into the battery cell(s) of each battery module that have not been charged to the UVP voltage level, until the battery cell(s) of all of the battery modules have been charged to at least the UVP voltage level, and (5) once the battery cell(s) within all of the battery modules have been charged to the UVP voltage level, allowing a full-charge current to flow into the battery cell(s) of the respective battery modules, the disclosed systems and methods can more reliably and advantageously pre-charge one or more battery cells within a plurality of battery modules arranged in a series-connected configuration.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings.

DETAILED DESCRIPTION

Systems and methods of pre-charging battery cells are disclosed that can more reliably pre-charge one or more rechargeable battery cells included in each of a plurality of series-connected battery modules. The disclosed systems and methods can monitor a value of a pre-charge current provided to the plurality of series-connected battery modules, as well as monitor a voltage level of the battery cell(s) within each battery module. The disclosed systems and methods can also switchingly interrupt the pre-charge current within any one of the battery modules once the pre-charge current has ramped up to a first threshold current value or the battery cell(s) within the battery module have been charged to a minimum voltage level needed for operation (also referred to herein as the "under voltage protection (UVP) voltage level"), thereby causing a flyback current to flow into the battery cell(s) of each battery module that have not yet been charged to at least the UVP voltage level. Once the flyback current within any one of the battery modules has ramped down to a second threshold current value, the disclosed systems and methods can again allow the pre-charge current to be provided to the respective battery modules. In response to one or more cycles of the pre-charge current ramping up to the first threshold current value and one or more flyback currents ramping down to the second threshold current value, the disclosed systems and methods can alternate between interrupting the pre-charge current and allowing the pre-charge current to be provided to the respective battery modules, until the battery cell(s) of each battery module have been charged to at least the UVP voltage level. Once the battery cell(s) within all of the battery modules have been charged to at least the UVP voltage level, the disclosed systems and methods can provide a full-charge current to the plurality of series-connected battery modules.

Figure 1:
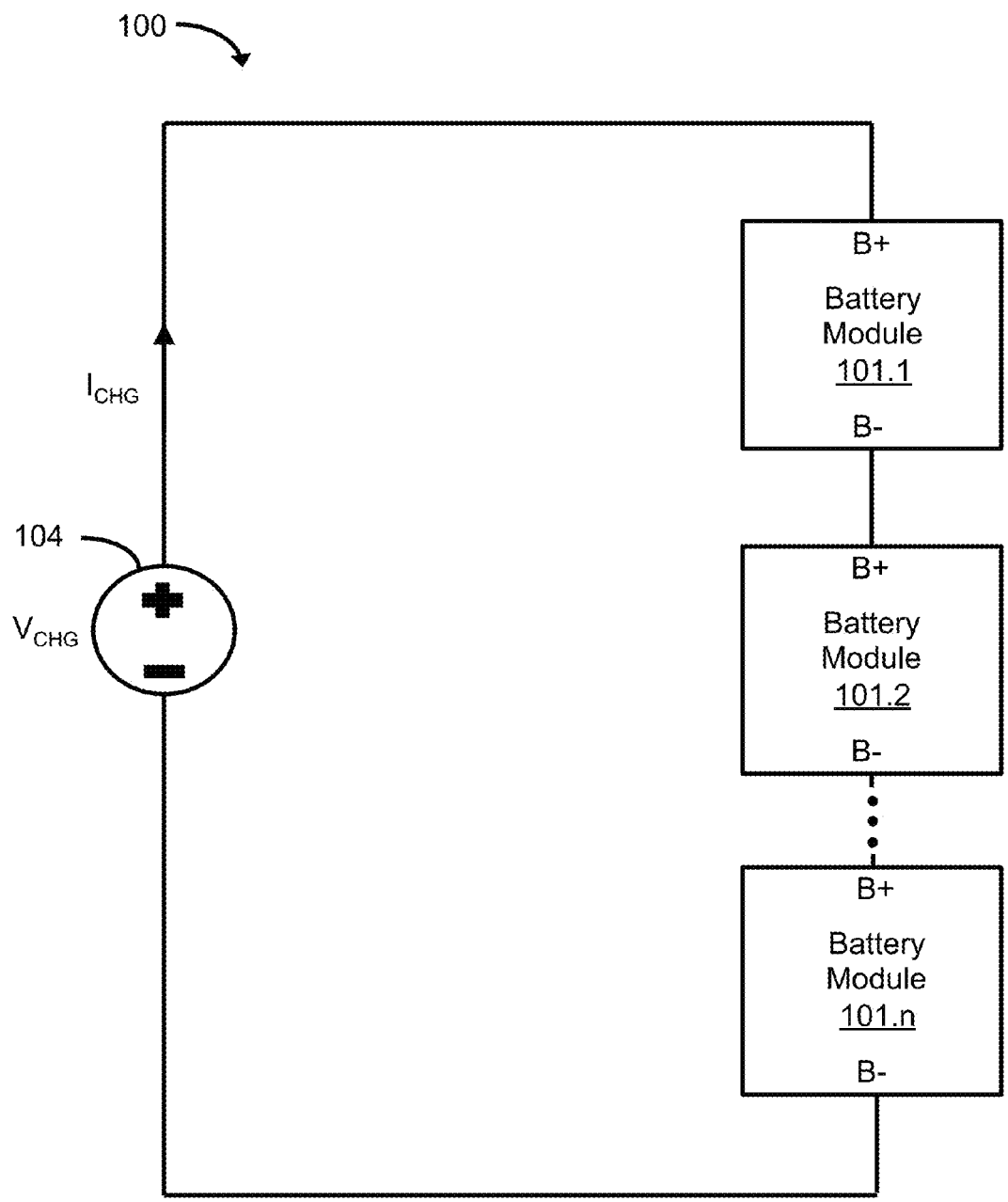
FIG. 1 is a block diagram of an exemplary system for pre-charging battery cells included in a plurality of series-connected battery modules.

FIG. 1 depicts an illustrative embodiment of an exemplary system 100 for pre-charging battery cells included in a plurality of series-connected battery modules. As shown in FIG. 1, the system 100 includes a plurality of battery modules 101.1, 101.2, ..., 101.n arranged in a series-connected configuration, and a charging voltage source ($V_{CHG}$) 104 connected across the plurality of series-connected battery modules 101.1, 101.2, ..., 101.n.

Figure 2:
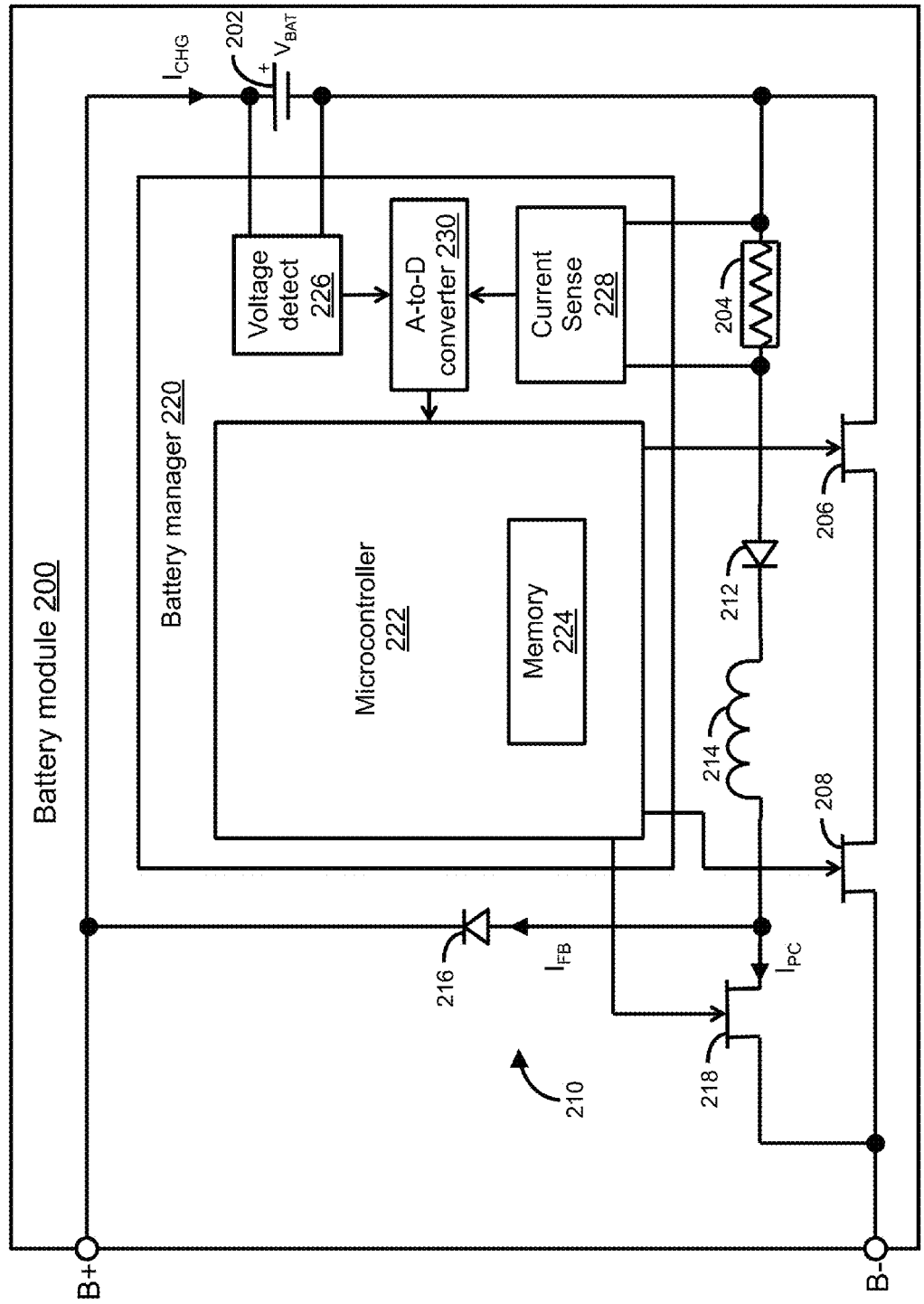
FIG. 2 is a block diagram of an exemplary battery module included in each of the plurality of series-connected battery modules of FIG. 1, in accordance with the present application.

FIG. 2 depicts an illustrative embodiment of an exemplary battery module 200, in accordance with the present application. It is noted that each of the plurality of battery modules 101.1, 101.2, ..., 101.n of FIG. 1 can be configured like the battery module 200 of FIG. 2. As shown in FIG. 2, the battery module 200 includes at least one rechargeable battery cell 202, a buck pre-charging circuit 210, a discharge switch 206, a charge switch 208, a current sense resistor 204, and a battery manager 220. For example, the discharge switch 206 can be a field effect transistor (also referred to herein as the "DFET switch"), and the charge switch 208 can likewise be a field effect transistor (also referred to herein as the "CFET switch"). Further, the rechargeable battery cell 202 can be a nickel-metal-hydride (NiMH) battery cell, a lithium-ion (Li-ion) battery cell, or any other suitable rechargeable battery cell. The buck pre-charging circuit 210 includes a blocking diode 212, an inductor 214, a flyback diode 216, and a pre-charge switch 218, which can also be a field effect transistor (also referred to herein as the "PFET switch"). The battery manager 220 includes a programmable microprocessor or microcontroller 222 and its associated program and/or data memory 224, battery cell voltage detect circuitry 226, a current sensor 228, and an analog-to-digital (A-to-D) converter 230. In an alternative embodiment, one or more of the DFET switch 206, the CFET switch 208, and the PFET switch 218 can be implemented as a relay, a contactor, an insulated gate bipolar transistor (IGBT), a metal-oxide substrate field effect transistor (MOSFET), a bipolar junction transistor (BJT), a silicon controlled rectifier (SCR), or any other suitable controllable switch.

In an exemplary mode of operation, once the charging voltage source ($V_{CHG}$) 104 is connected across the plurality of series-connected battery modules 101.1, 101.2, ..., 101.n, the system 100 enters a pre-charging mode and operates, as follows. Within each battery module 101.1, 101.2, ..., 101.n (each being configured like the battery module 200; see FIG. 2), the microcontroller 222 initially maintains each of the DFET switch 206 and the CFET switch 208 in its opened or "OFF" state, and places the PFET switch 218 in its closed or "ON" state, thereby allowing a pre-charge current to flow from the charging voltage source ($V_{CHG}$) 104, successively through the series of connected battery modules 101.1, 101.2, ..., 101.n, and ultimately back to the charging voltage source ($V_{CHG}$) 104. For example, the RMS value of the pre-charge current can be equal to about 480 milli-amperes (mA), or any other suitable value.

Figure 3A:
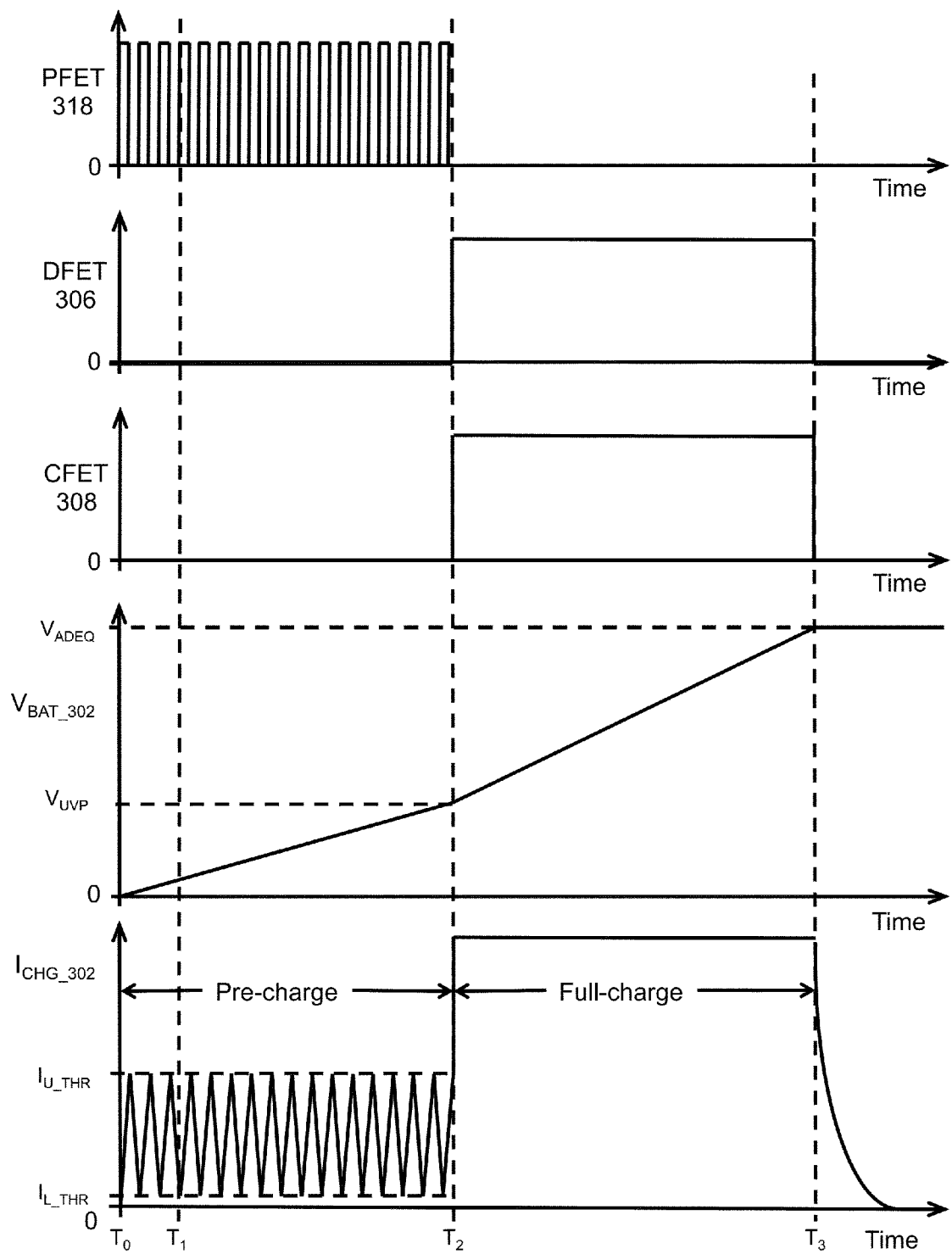
FIGS. 3a and 3b are timing diagrams illustrating an exemplary mode of operating the battery module of FIG. 2.

FIG. 3a depicts a timing diagram that illustrates a first time period, from time $T_0$ to time $T_2$, corresponding to the pre-charging mode ("Pre-charge"; see FIG. 3a). As illustrated in FIG. 3a, the microcontroller 222 can apply, from time $T_0$ to time $T_2$, a first control voltage comprising a voltage pulse train ("PFET 318"; see FIG. 3a) to the gate of the PFET switch 218. The voltage pulse train, PFET 318, includes a plurality of "high" voltage levels suitable for placing the PFET switch 218 in its closed or "ON" state, and a plurality of "low" voltage levels suitable for placing the PFET switch 218 in its opened or "OFF" state. As further illustrated in FIG. 3a, the microcontroller 222 can also apply a second control voltage ("DFET 306"; see FIG. 3a) and a third control voltage ("CFET 308"; see FIG. 3a) to the gates of the DFET switch 206 and the CFET switch 208, respectively, at a low voltage level suitable for initially maintaining each of the DFET and CFET switches 206, 208 in its opened or "OFF" state. FIG. 3a also illustrates a battery cell charge current ("$I_{CHG\_302}$"; see FIG. 3a), which, during the first time period (i.e., from time $T_0$ to time $T_2$), corresponds to the pre-charge current, as well as a battery cell voltage ("$V_{BAT\_302}$"; see FIG. 3a), which corresponds to the voltage level ($V_{BAT}$) of the battery cell 202 within the battery module 200. It is noted that the battery cell charge current, $I_{CHG\_302}$, can correspond to a battery cell charge current ($I_{CHG}$) flowing through the battery cell 202 (see FIG. 2).

Figure 4A:
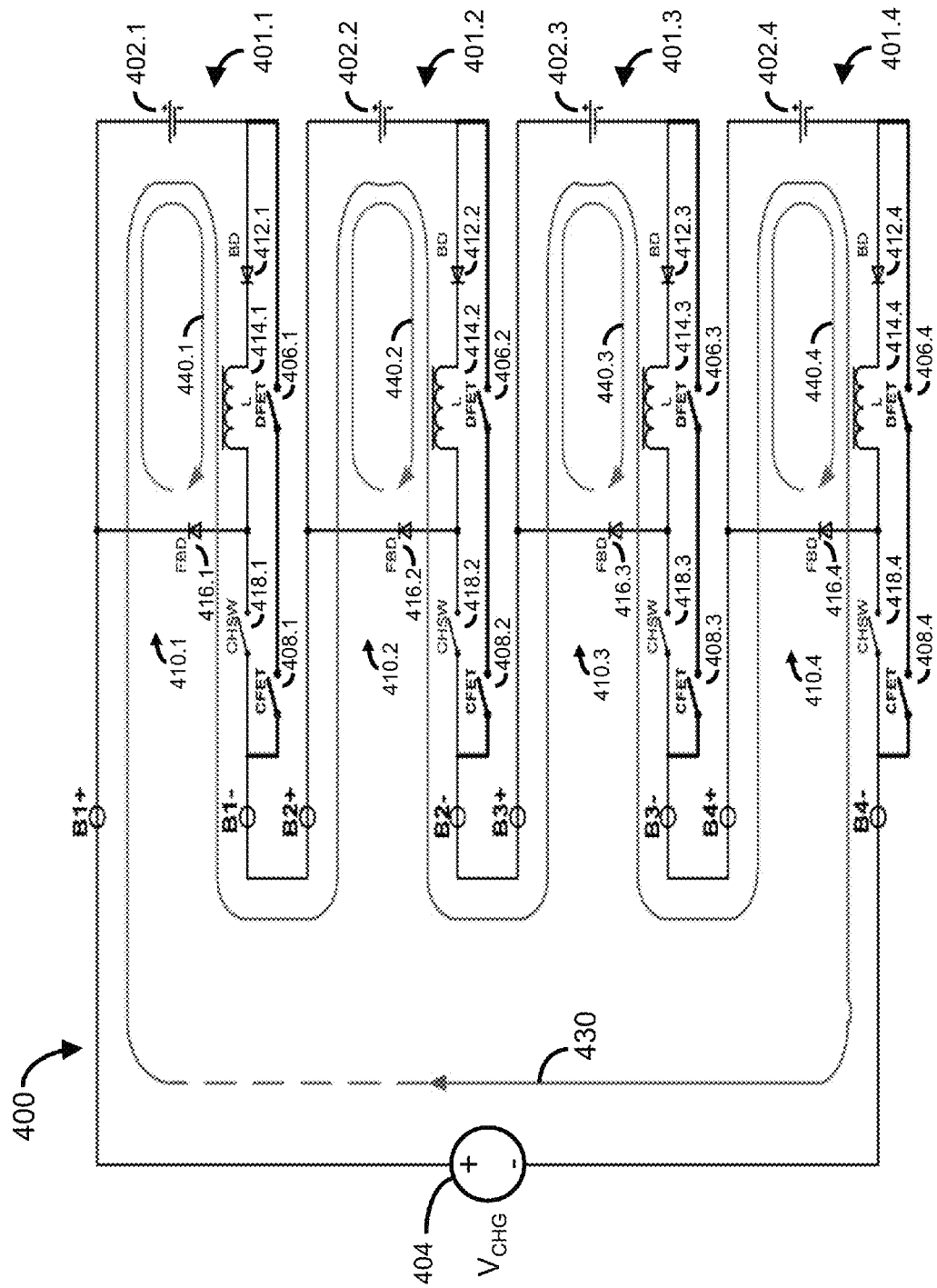
FIGS. 4a-4j are schematic diagrams illustrating an exemplary flow of pre-charge current through a plurality of series-connected battery modules, each of which can be configured like the battery module of FIG. 2, and further illustrating an exemplary flow of flyback current through each of the respective battery modules.

FIG. 4a depicts another illustrative embodiment of an exemplary system 400 for pre-charging battery cells included in a plurality of series-connected battery modules, showing an exemplary flow of a pre-charge current 430 from a charging voltage source ($V_{CHG}$) 404, through a plurality of series-connected battery modules 401.1, 401.2, 401.3, 401.4, and ultimately back to the charging voltage source ($V_{CHG}$) 404. It is noted that each of the plurality of battery modules 401.1, 401.2, 401.3, 401.4 can be configured like the battery module 200 of FIG. 2. As shown in FIG. 4a, the battery module 401.1 includes at least one rechargeable battery cell 402.1, a DFET switch 406.1, a CFET switch 408.1, and a buck pre-charging circuit 410.1, which, in turn, includes a blocking diode 412.1, an inductor 414.1, a flyback diode 416.1, and a PFET switch 418.1. Likewise, the battery module 401.2 includes at least one rechargeable battery cell 402.2, a DFET switch 406.2, a CFET switch 408.2, and a buck pre-charging circuit 410.2 including a blocking diode 412.2, an inductor 414.2, a flyback diode 416.2, and a PFET switch 418.2; the battery module 401.3 includes at least one rechargeable battery cell 402.3, a DFET switch 406.3, a CFET switch 408.3, and a buck pre-charging circuit 410.3 including a blocking diode 412.3, an inductor 414.3, a flyback diode 416.3, and a PFET switch 418.3; and, the battery module 401.4 includes at least one rechargeable battery cell 402.4, a DFET switch 406.4, a CFET switch 408.4, and a buck pre-charging circuit 410.4 including a blocking diode 412.4, an inductor 414.4, a flyback diode 416.4, and a PFET switch 418.4.

Once the system 400 (see FIG. 4a) enters the pre-charging mode, each of the DFET switches 406.1, 406.2, 406.3, 406.4 and the CFET switches 408.1, 408.2, 408.3, 408.4 are initially maintained in its opened or "OFF" state, and each of the PFET switches 418.1, 418.2, 418.3, 418.4 are placed in its closed or "ON" state, thereby allowing the pre-charge current 430 to flow from the charging voltage source ($V_{CHG}$) 404, successively through the series of connected battery modules 401.1, 401.2, 401.3, 401.4, and ultimately back to the charging voltage source ($V_{CHG}$) 404. Specifically, within the battery module 401.1, the pre-charge current 430 flows into the battery cell 402.1, through each of the blocking diode 412.1 and the inductor 414.1, and across the closed PFET switch 418.1 to the next battery module 401.2 in the series of connected battery modules 401.1, 401.2, 401.3, 401.4. Likewise, within the battery module 401.2, the pre-charge current 430 flows into the battery cell 402.2, through each of the blocking diode 412.2 and the inductor 414.2, and across the closed PFET switch 418.2 to the next battery module 401.3 in the series of connected battery modules 401.1, 401.2, 401.3, 401.4; within the battery module 401.3, the pre-charge current 430 flows into the battery cell 402.3, through each of the blocking diode 412.3 and the inductor 414.3, and across the closed PFET switch 418.3 to the next battery module 401.4 in the series of connected battery modules 401.1, 401.2, 401.3, 401.4; and, within the battery module 401.4, the pre-charge current 430 flows into the battery cell 402.4, through each of the blocking diode 412.4 and the inductor 414.4, and across the closed PFET switch 418.4 back to the charging voltage source ($V_{CHG}$) 404.

With regard to the system 100 (see FIG. 1) operating in the pre-charging mode, within each battery module 101.1, 101.2, ..., 101.n (each being configured like the battery module 200; see FIG. 2), the current sensor 228 detects, senses, monitors, or otherwise determines a value of the pre-charge current flowing through the current sense resistor 204, and the battery cell voltage detect circuitry 226 detects, senses, monitors, or otherwise determines a voltage level ($V_{BAT}$) of the battery cell 202. Further, the A-to-D converter 230 converts each of the value of the pre-charge current and the voltage level of the battery cell 202 from analog form to digital form, and provides, in digital form, the value of the pre-charge current and the voltage level of the battery cell 202 to the microcontroller 222. Once the microcontroller 222 within at least one of the battery modules 101.1, 101.2, ..., 101.n determines that the pre-charge current has ramped up to a first threshold current value ("$I_{U\_THR}$"; see FIG. 3b), the microcontroller 222 directs the PFET switch 218 within the battery module 200 to transition from its closed or "ON" state to its opened or "OFF" state.

Figure 3B:
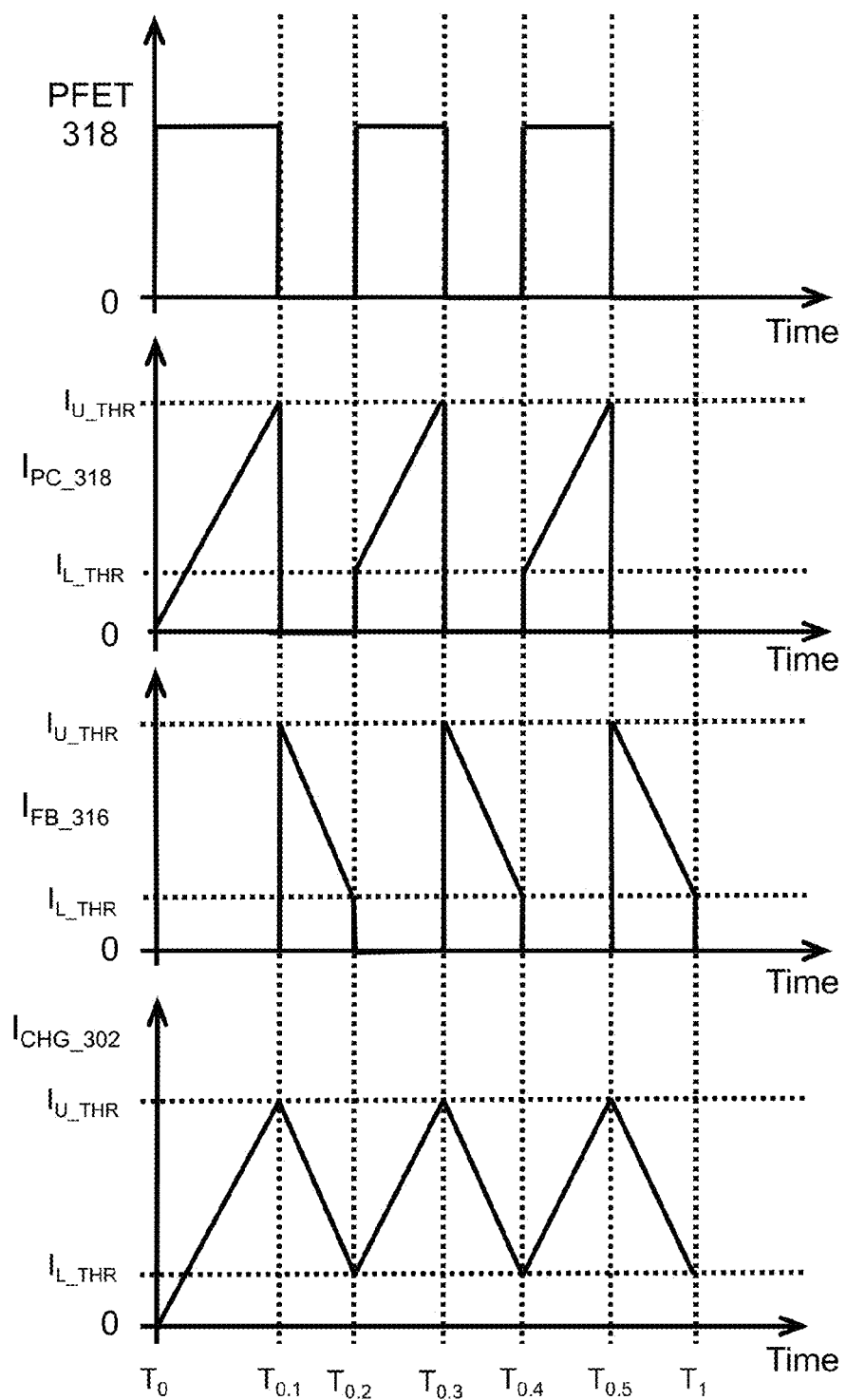

FIG. 3b depicts a timing diagram that illustrates a detailed view of a portion, from time $T_0$ to time $T_1$, of the first time period corresponding to the pre-charging mode ("Pre-charge"; see FIG. 3a). With reference to FIG. 3b, the microcontroller 222 (see FIG. 2) can apply the voltage pulse train, PFET 318, including a plurality of high voltage levels from time $T_0$ to time $T_{0.1}$, from time $T_{0.2}$ to time $T_{0.3}$, and from time $T_{0.4}$ to time $T_{0.5}$, respectively, to the gate of the PFET switch 218 to repeatedly place the PFET switch 218 in its closed or "ON" state. During each such time interval (i.e., from time $T_0$ to time $T_{0.1}$, from time $T_{0.2}$ to time $T_{0.3}$, and from time $T_{0.4}$ to time $T_{0.5}$), the pre-charge current (also referred to herein as "$I_{PC\_318}$"; see FIG. 3b) ramps up to the first threshold current value, $I_{U\_THR}$, at which point the microcontroller 222 directs the PFET switch 218 to transition from its closed or "ON" state to its opened or "OFF" state, thereby resulting in a plurality of low voltage levels of the voltage pulse train, PFET 318, from time $T_{0.1}$ to time $T_{0.2}$, from time $T_{0.3}$ to time $T_{0.4}$, and from time $T_{0.5}$ to time $T_1$, respectively. It is noted that the pre-charge current, $I_{PC\_318}$, can correspond to a pre-charge current ($I_{PC}$) flowing through the PFET switch 218 (see FIG. 2).

Once the PFET switch 218 within the battery module 200 has transitioned to its opened or "OFF" state, the flow of the pre-charge current is interrupted, and a flyback current is caused to flow within each battery module 101.1, 101.2, ..., 101.n. Before being interrupted, however, the pre-charge current effectively charges the inductor 214, thereby inducing a magnetic field within the inductor 214. Once the pre-charge current is interrupted by opening the PFET switch 218, the magnetic field in the inductor 214 begins to collapse, causing a flyback current to flow, within each battery module 101.1, 101.2, ..., 101.n, from the inductor 214, through the flyback diode 216, into the battery cell 202, and through both of the current sense resistor 204 and the blocking diode 212 back to the inductor 214 of the battery module 200.

It is noted that the battery manager 220 within any one of the plurality of series of connected battery modules 101.1, 101.2, ..., 101.n can interrupt the flow of the pre-charge current within the respective battery module, depending on variations in one or more of sensitivity, battery voltages, inductor and other tolerances, etc. It is further noted that, within each battery module 101.1, 101.2, ..., 101.n, while the PFET switch 218 is in its closed or "ON" state, the voltage across terminals B+, B– (see FIG. 2) of the battery cell 202 is equal to the voltage drop across the flyback diode 216. If the PFET switch 218 within one of the series-connected battery modules 101.1, 101.2, ..., 101.n is in its opened or "OFF" state, while the PFET switch 218 in each of the remaining battery modules 101.1, 101.2, ..., 101.n is in its closed or "ON" state, then the voltage across the opened PFET switch 218 is equal to the difference between (1) a full-charging voltage of the charging voltage source ($V_{CHG}$) 104, and (2) the sum of the voltage drops across the respective flyback diodes 216 within the remaining battery modules 101.1, 101.2, ..., 101.n. For example, the full-charging voltage of the charging voltage source ($V_{CHG}$) 104 can be equal to about 60 volts or any other suitable value, and each voltage drop across the respective flyback diodes 216 within the remaining battery modules 101.1, 101.2, ..., 101.n can be equal to about 0.7 volts or any other suitable value.

Within each battery module 101.1, 101.2, ..., 101.n (each being configured like the battery module 200; see FIG. 2), the current sensor 228 detects, senses, monitors, or otherwise determines a value of the flyback current flowing through the current sense resistor 204. In the event the microcontroller 222 within at least one of the battery modules 101.1, 101.2, ..., 101.n determines that the flyback current has ramped down to a second threshold current value ("$I_{L\_THR}$"; see FIG. 3b), the microcontroller 222 directs the PFET switch 218 that was previously directed to transition from its closed or "ON" state to its opened or "OFF" state to transition from its opened or "OFF" state back to its closed or "ON" state. Because the PFET switches within all of the battery modules 101.1, 101.2, ..., 101.n are in their closed or "ON" state, the pre-charge current is again allowed to flow from the charging voltage source ($V_{CHG}$) 104, successively through the series of connected battery modules 101.1, 101.2, ..., 101.n, and ultimately back to the charging voltage source ($V_{CHG}$) 104.

As described herein, FIG. 3b depicts the plurality of low voltage levels of the voltage pulse train, PFET 318 (e.g., from time $T_{0.1}$ to time $T_{0.2}$, from time $T_{0.3}$ to time $T_{0.4}$, and from time $T_{0.5}$ to time $T_1$), which the microcontroller 222 (see FIG. 2) can apply to the gate of the PFET switch 218 to repeatedly place the PFET switch 218 in its opened or "OFF" state. During each such time interval (i.e., from time $T_{0.1}$ to time $T_{0.2}$, from time $T_{0.3}$ to time $T_{0.4}$, and from time $T_{0.5}$ to time $T_1$), the flyback current ("$I_{FB\_316}$"; see FIG. 3b) ramps down from the first threshold current value, $I_{U\_THR}$, to the second threshold current value, $I_{L\_THR}$, at which point the microcontroller 222 directs the PFET switch 218 to transition from its opened or "OFF" state to its closed or "ON" state. It is noted that the flyback current, $I_{FB\_316}$, can correspond to a flyback current ($I_{FB}$) flowing through the flyback diode 216 (see FIG. 2).

FIG. 4a depicts exemplary flows of flyback currents 440.1, 440.2, 440.3, 440.4 flowing through the plurality of series-connected battery modules 401.1, 401.2, 401.3, 401.4, respectively. With regard to the battery module 401.1, assuming that the DFET switch 406.1 and the CFET switch 408.1 are each being maintained in its opened or "OFF" state, once any one of the PFET switches 418.1-418.4 transitions from its closed or "ON" state to its opened or "OFF" state, the flyback current 440.1 is caused to flow from the inductor 414.1, through the flyback diode 416.1, into the battery cell 402.1, and through the blocking diode 412.1 back to the inductor 414.1. Further, with regard to the battery module 401.2, assuming that the DFET switch 406.2 and the CFET switch 408.2 are each being maintained in its opened or "OFF" state, the flyback current 440.2 is caused to flow from the inductor 414.2, through the flyback diode 416.2, into the battery cell 402.2, and through the blocking diode 412.2 back to the inductor 414.2. Likewise, with regard to the battery module 401.3, assuming that the DFET switch 406.3 and the CFET switch 408.3 are each being maintained in its opened or "OFF" state, the flyback current 440.3 is caused to flow from the inductor 414.3, through the flyback diode 416.3, into the battery cell 402.3, and through the blocking diode 412.3 back to the inductor 414.3. Moreover, with regard to the battery module 401.4, assuming that the DFET switch 406.4 and the CFET switch 408.4 are each being maintained in its opened or "OFF" state, the flyback current 440.4 is caused to flow from the inductor 414.4, through the flyback diode 416.4, into the battery cell 402.4, and through the blocking diode 412.4 back to the inductor 414.4.

As described herein, once the PFET switches within all of the battery modules 101.1, 101.2, . . . , 101.n are in their closed or "ON" state, the pre-charge current is allowed to flow from the charging voltage source ($V_{CHG}$) 104, successively through the series of connected battery modules 101.1, 101.2, . . . , 101.n, and ultimately back to the charging voltage source ($V_{CHG}$) 104. Within each battery module 101.1, 101.2, . . . , 101.n (each being configured like the battery module 200; see FIG. 2), the current sensor 228 detects, senses, monitors, or otherwise determines a value of the pre-charge current flowing through the current sense resistor 204, and the battery cell voltage detect circuitry 226 detects, senses, monitors, or otherwise determines a voltage level of the battery cell 202. Once the battery cell voltage detect circuitry 226 within at least one of the battery modules 101.1, 101.2, . . . , 101.n determines that the battery cell(s) within the battery module (such as the battery cell 202; see FIG. 2) have been charged to at least the UVP voltage level (see FIG. 3a, which depicts the battery cell voltage, $V_{BAT\_302}$, rising at a substantially constant slope to the UVP voltage level, "$V_{UVP}$"), the microcontroller 222 directs the PFET switch 218 within the battery module 200 to transition from its closed or "ON" state to its opened or "OFF" state, and further directs each of the DFET and CFET switches 206, 208 within the battery module 200 to transition from its opened or "OFF" state to its closed or "ON" state, thereby providing a bypass path around the buck pre-charging circuit 210, including the opened PFET switch 218, within the battery module 200.

In response to one or more cycles of the pre-charge current, $I_{PC\_318}$ (see FIG. 3b), ramping up to the first threshold current value, $I_{U\_THR}$, and one or more flyback currents, $I_{FB\_316}$ (see also FIG. 3b), ramping down to the second threshold current value, $I_{L\_THR}$, the battery modules 101.1, 101.2, . . . , 101.n can alternate between (1) allowing the pre-charge current to flow through the respective battery modules 101.1, 101.2, . . . , 101.n, and (2) interrupting the pre-charge current to cause a flyback current to flow into the battery cell(s) of each battery module 101.1, 101.2, . . . , 101.n that have not yet been charged to the UVP voltage level, until the battery cell(s) within all of the battery modules 101.1, 101.2, . . . , 101.n have been charged to at least the UVP voltage level. As shown in FIG. 3b, the battery cell charge current, $I_{CHG\_302}$, can follow both the pre-charge current, $I_{PC\_318}$, ramping up to the first threshold current value, $I_{U\_THR}$, and the flyback current, $I_{FB\_316}$, ramping down to the second threshold current value, $I_{L\_THR}$.

Once the battery cells within all of the battery modules 101.1, 101.2, . . . , 101.n have been charged to at least the UVP voltage level, the system 100 exits the pre-charging mode, enters a full-charging mode, and subsequently operates, as follows. Within each battery module 101.1, 101.2, . . . , 101.n, once each of the DFET and CFET switches 206, 208 has transitioned to its closed or "ON" state, a full-charge current is allowed to flow from the charging voltage source ($V_{CHG}$) 104, into the battery cell 202, and across the closed DFET and CFET switches 206, 208 to either to the next battery module in the series of connected battery modules 101.1, 101.2, . . . , 101.4, or, if the battery module is the last battery module in the series of connected battery modules 101.1, 101.2, . . . , 101.4, then back to the charging voltage source ($V_{CHG}$) 104. It is noted that, in the full-charging mode, the full-charging voltage of the charging voltage source ($V_{CHG}$) 104 is applied across the PFET switch 218 in its opened or "OFF" state. The PFET switch 218 is therefore preferably rated approximately 30% to 50% above the maximum full-charging voltage.

FIG. 3a illustrates a second time period, from time $T_2$ to time $T_3$, corresponding to the full-charging mode ("Full-charge"; see FIG. 3a). As illustrated in FIG. 3a, the microcontroller 222 can apply, from time $T_2$ to time $T_3$, the control voltage DFET 306 and the control voltage CFET 308 to the gates of the DFET switch 206 and the CFET switch 208, respectively, at the high voltage level suitable for transitioning each of the DFET and CFET switches 206, 208 from its opened or "OFF" state to its closed or "ON" state. FIG. 3a further illustrates the battery cell charge current $I_{CHG\_302}$, which, during the second time period (i.e., from time $T_2$ to time $T_3$), corresponds to the full-charge current.

With regard to the system 100 (see FIG. 1) operating in the full-charging mode, within each battery module 101.1, 101.2, . . . , 101.n (each being configured like the battery module 200; see FIG. 2), the battery cell voltage detect circuitry 226 further detects, senses, monitors, or otherwise determines the voltage level of the battery cell 202. As illustrated in FIG. 3a, during the second time period (i.e., from time $T_2$ to time $T_3$), the value of the full-charge current, $I_{CHG\_302}$, can be constant and equal to a value higher than the first threshold current value, $I_{U\_THR}$, and the battery cell voltage. $V_{BAT\_302}$, can rise at a steeper constant slope to an adequate voltage level ("$V_{ADEQ}$"; see FIG. 3a). Further, the A-to-D converter 230 converts the voltage level of the battery cell 202 from analog form to digital form, and provides, in digital form, the voltage level of the battery cell 202 to the microcontroller 222. Once the microcontroller 222 determines that the battery cell 202 is adequately charged based at least on the voltage level, $V_{ADEQ}$, of the battery cell 202, the microcontroller 222 can direct each of the DFET and CFET switches 206, 208 to transition from its closed or "ON" state to its opened or "OFF" state to interrupt the full-charge current, and the system 100 can exit the full-charging mode.

Figure 4B:
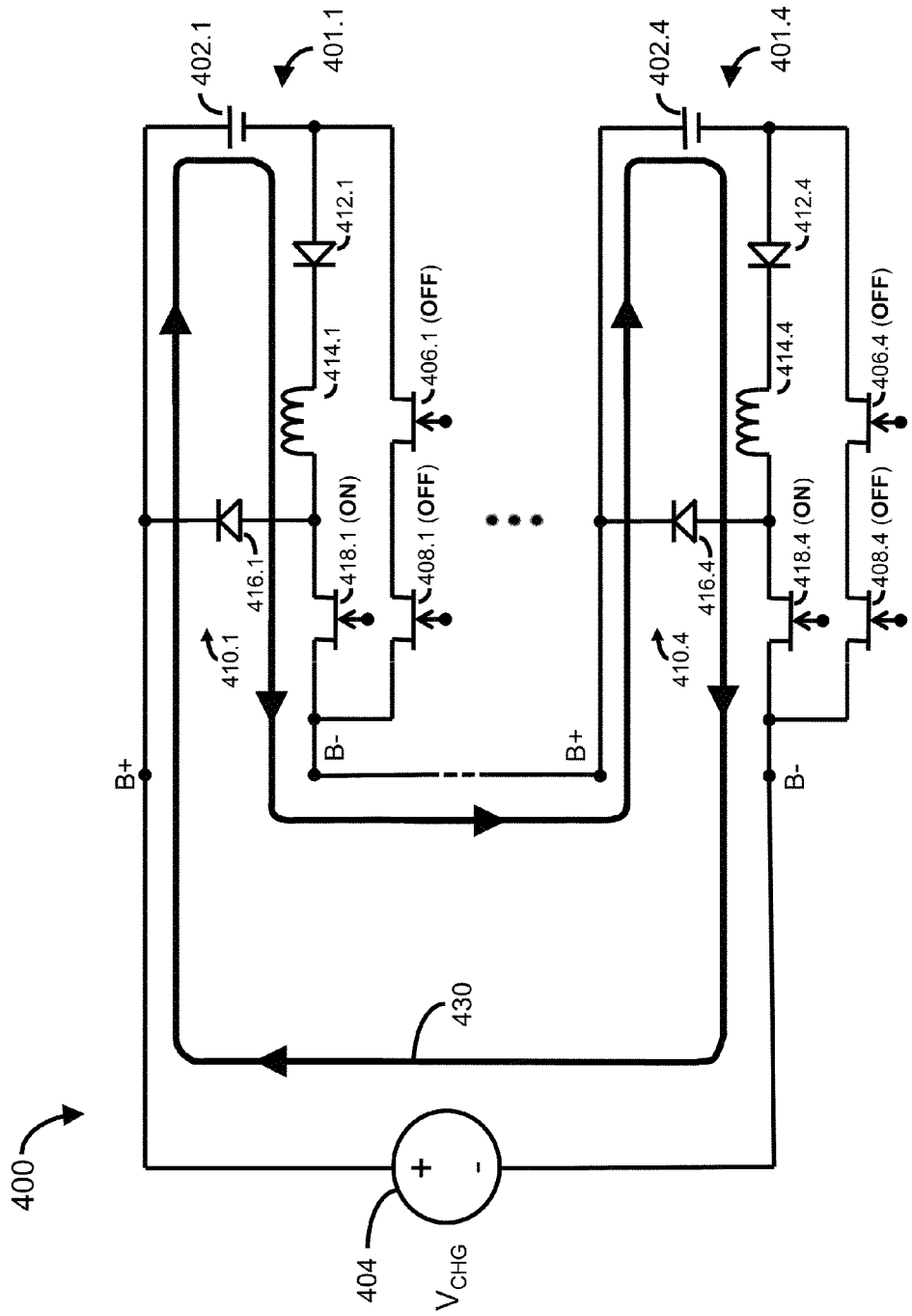

The disclosed system for pre-charging battery cells included in a plurality of series-connected battery modules will be further understood with reference to the following illustrative example, as well as FIGS. 4b-4j. As shown in FIG. 4b, once the charging voltage source ($V_{CHG}$) 404 is connected across the plurality of series-connected battery modules 401.1, . . . , 401.4, the system 400 enters the pre-charging mode. Within the battery modules 401.1, . . . , 401.4, each of the DFET switches 406.1, . . . , 406.4 and CFET switches 408.1, . . . , 408.4 is initially maintained in its opened or "OFF" state, and each of the PFET switches 418.1, . . . , 418.4 is placed in its closed or "ON" state, thereby allowing the pre-charge current 430 to flow from the charging voltage source ($V_{CHG}$) 404, successively through the series of connected battery modules 401.1, . . . , 401.4, and ultimately back to the charging voltage source ($V_{CHG}$) 404.

Figure 4C:
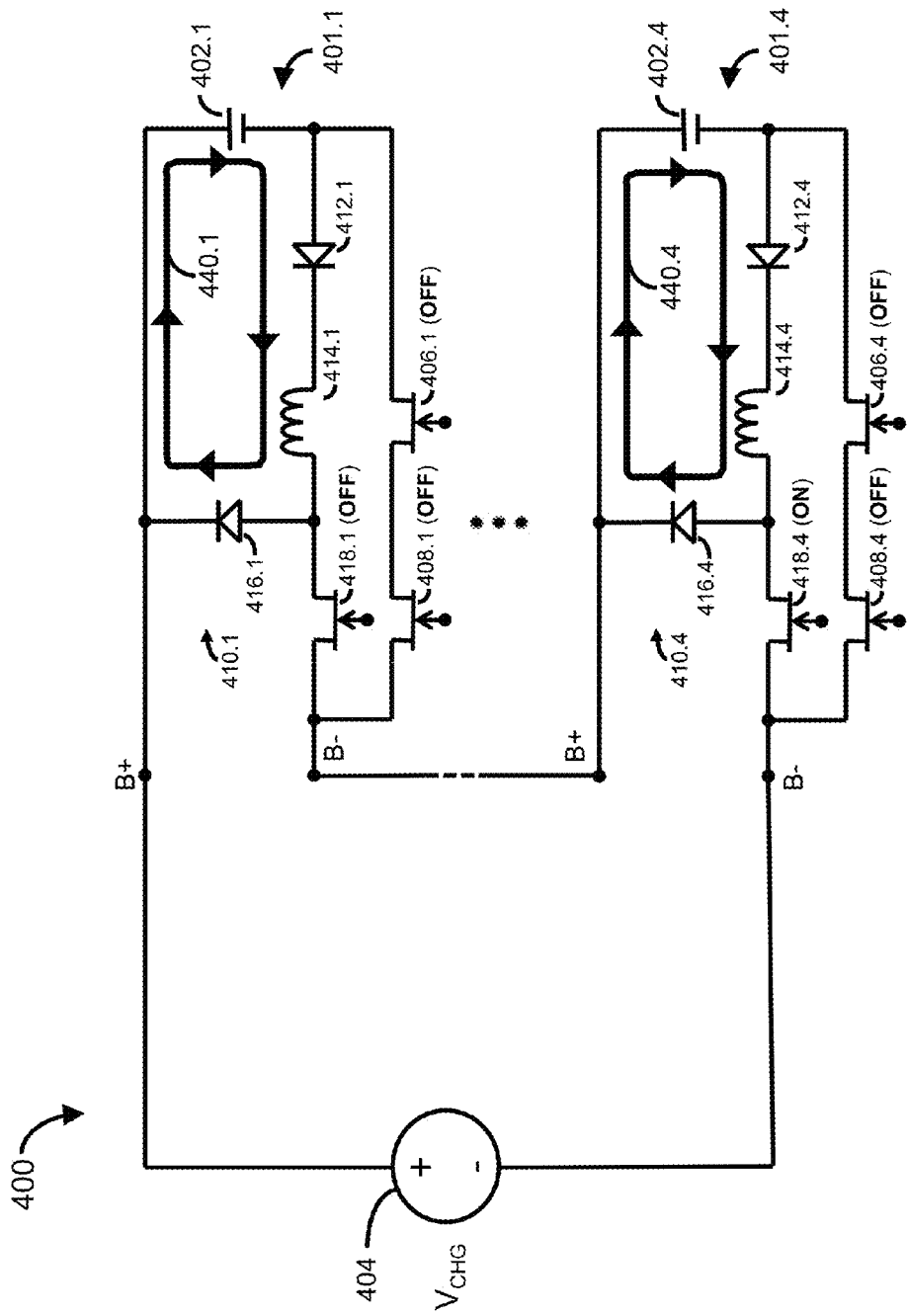

In this example, it is determined, within the battery module 401.1, that the pre-charge current 430 has ramped up to the first threshold current value, $I_{U\_THR}$. The PFET switch 418.1 within the battery module 401.1 is therefore directed to transition from its closed or "ON" state to its opened or "OFF" state (see FIG. 4c). As shown in FIG. 4c, once the PFET switch 418.1 within the battery module 401.1 has transitioned to its opened or "OFF" state, the flow of the pre-charge current 430 is interrupted, and a plurality of flyback currents 440.1, . . . , 440.4 are caused to flow within the battery modules 401.1, . . . , 401.4, respectively.

Figure 4D:
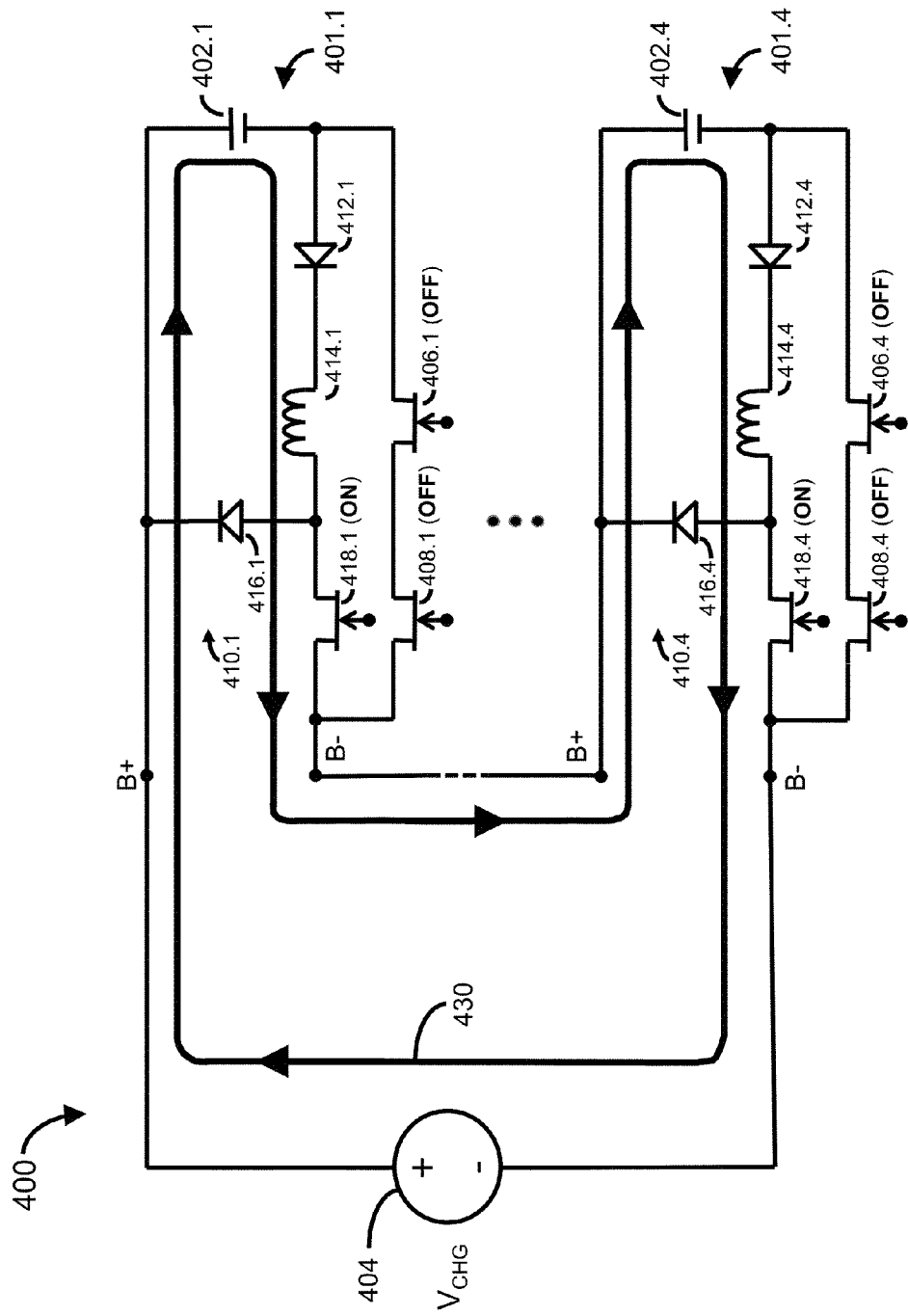

Once it is determined, within the battery modules 401.1, . . . , 401.4, that at least one of the flyback currents 440.1, . . . , 440.4 has ramped down to the second threshold current value. $I_{L\_THR}$, the PFET switch 418.1 within the battery module 401.1 is directed to transition from its opened or "OFF" state back to its closed or "ON" state (see FIG. 4d). As shown in FIG. 4d, because the PFET switches 418.1, . . . , 418.4 within the respective battery modules 401.1, . . . , 401.4 are all in their closed or "ON" states, the pre-charge current 430 is again allowed to flow from the charging voltage source ($V_{CHG}$) 404, successively through the series of connected battery modules 401.1, . . . , 401.4, and ultimately back to the charging voltage source ($V_{CHG}$) 404.

Figure 4E:
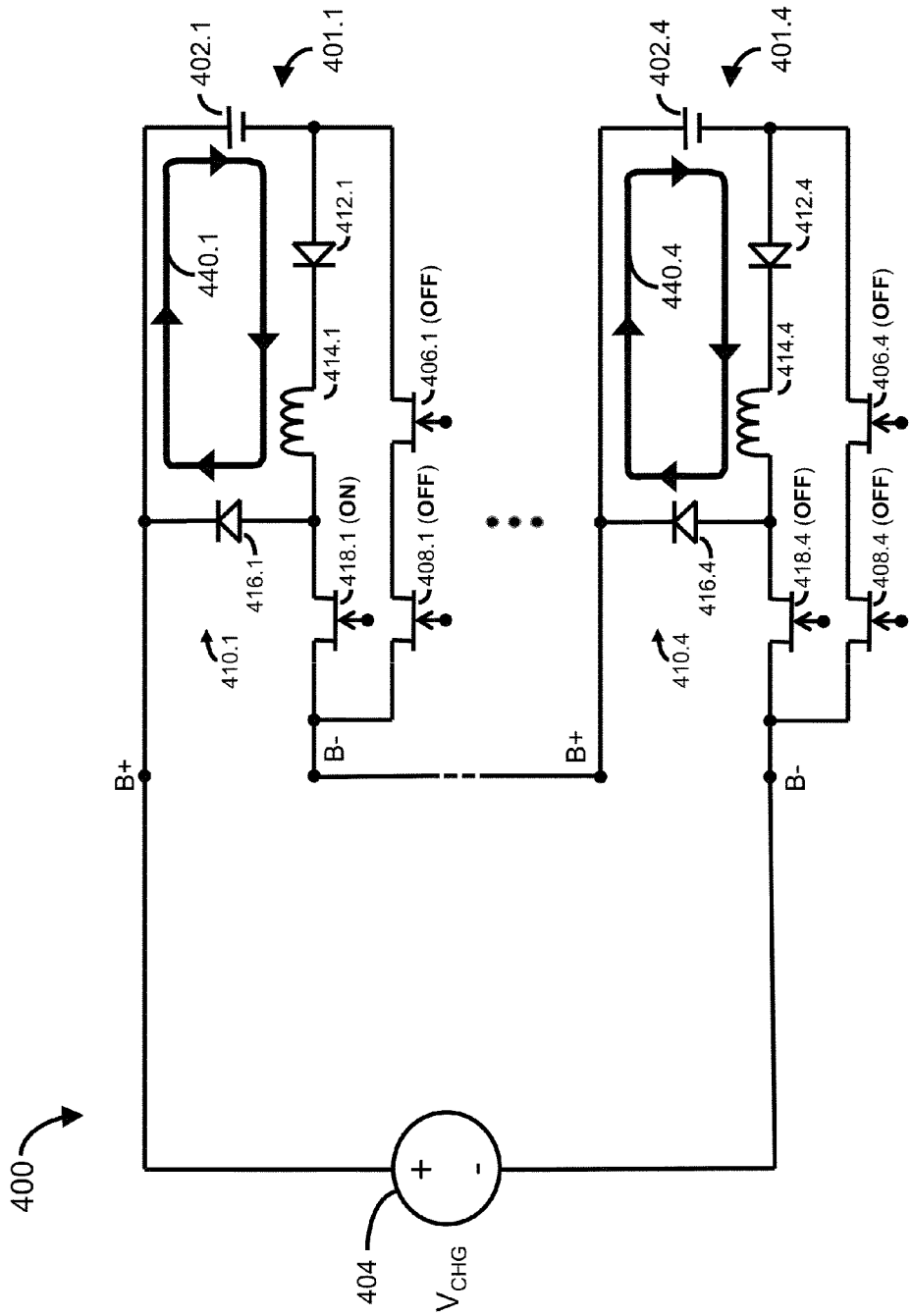

In this example, it is further determined, within the battery module 401.4, that the pre-charge current 430 has ramped up to the first threshold current value, $I_{U\_THR}$. The PFET switch 418.4 within the battery module 401.4 is therefore directed to transition from its closed or "ON" state to its opened or "OFF" state (see FIG. 4e). As shown in FIG. 4e, once the PFET switch 418.4 within the battery module 401.4 has transitioned to its opened or "OFF" state, the flow of the pre-charge current 430 is again interrupted, and the plurality of flyback currents 440.1, . . . , 440.4 are again caused to flow within the battery modules 401.1, . . . , 401.4, respectively.

Figure 4F:
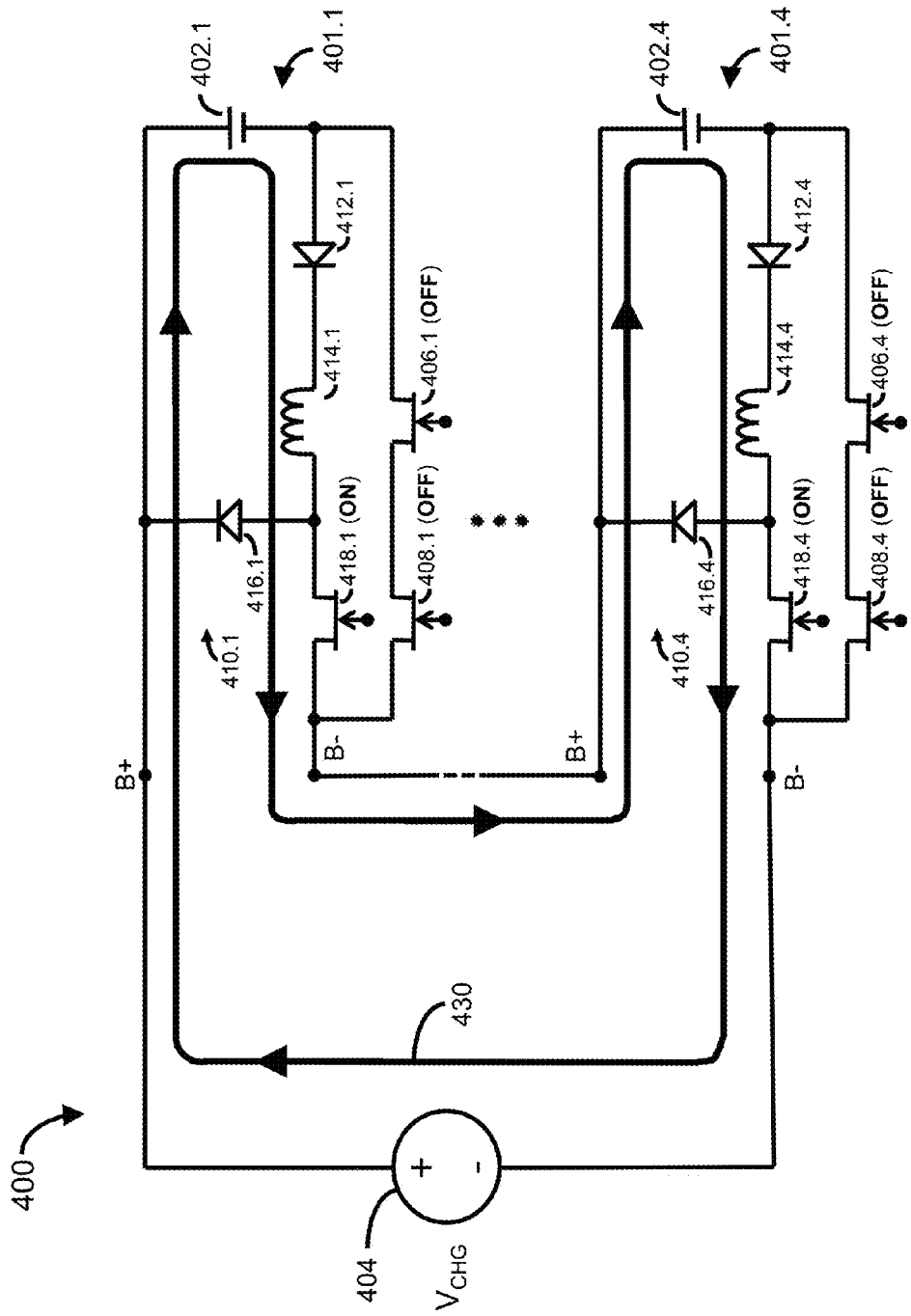

Once it is determined, within the battery modules 401.1, . . . , 401.4, that at least one of the flyback currents 440.1, . . . , 440.4 has ramped down to the second threshold current value. $I_{L\_THR}$, the PFET switch 418.4 within the battery module 401.4 is directed to transition from its opened or "OFF" state back to its closed or "ON" state (see FIG. 4f). As shown in FIG. 4f, because the PFET switches 418.1, . . . , 418.4 within the respective battery modules 401.1, . . . , 401.4 are all in their closed or "ON" states, the pre-charge current 430 is again allowed to flow from the charging voltage source ($V_{CHG}$) 404, successively through the series of connected battery modules 401.1, . . . , 401.4, and ultimately back to the charging voltage source ($V_{CHG}$) 404.

Figure 4G:
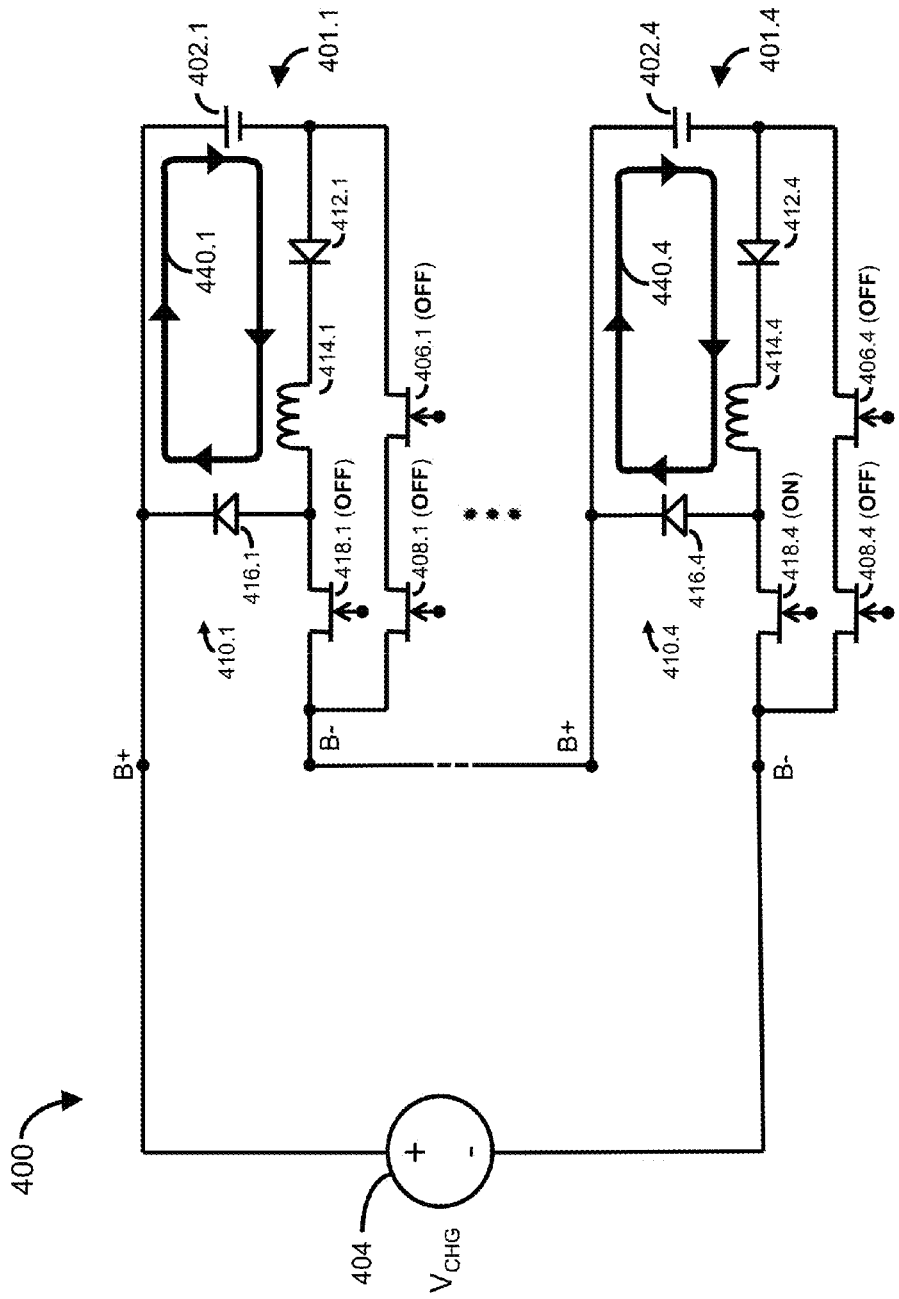

In this example, it is determined, within the battery module 401.1, that the pre-charge current 430 has ramped up to the first threshold current value, $I_{U\_THR}$. The PFET switch 418.1 within the battery module 401.1 is therefore directed to transition from its closed or "ON" state to its opened or "OFF" state (see FIG. 4g). As shown in FIG. 4g, once the PFET switch 418.1 within the battery module 401.1 has transitioned to its opened or "OFF" state, the flow of the pre-charge current 430 is interrupted, and the plurality of flyback currents 440.1, . . . , 440.4 are caused to flow within the battery modules 401.1, . . . , 401.4, respectively.

Figure 4H:
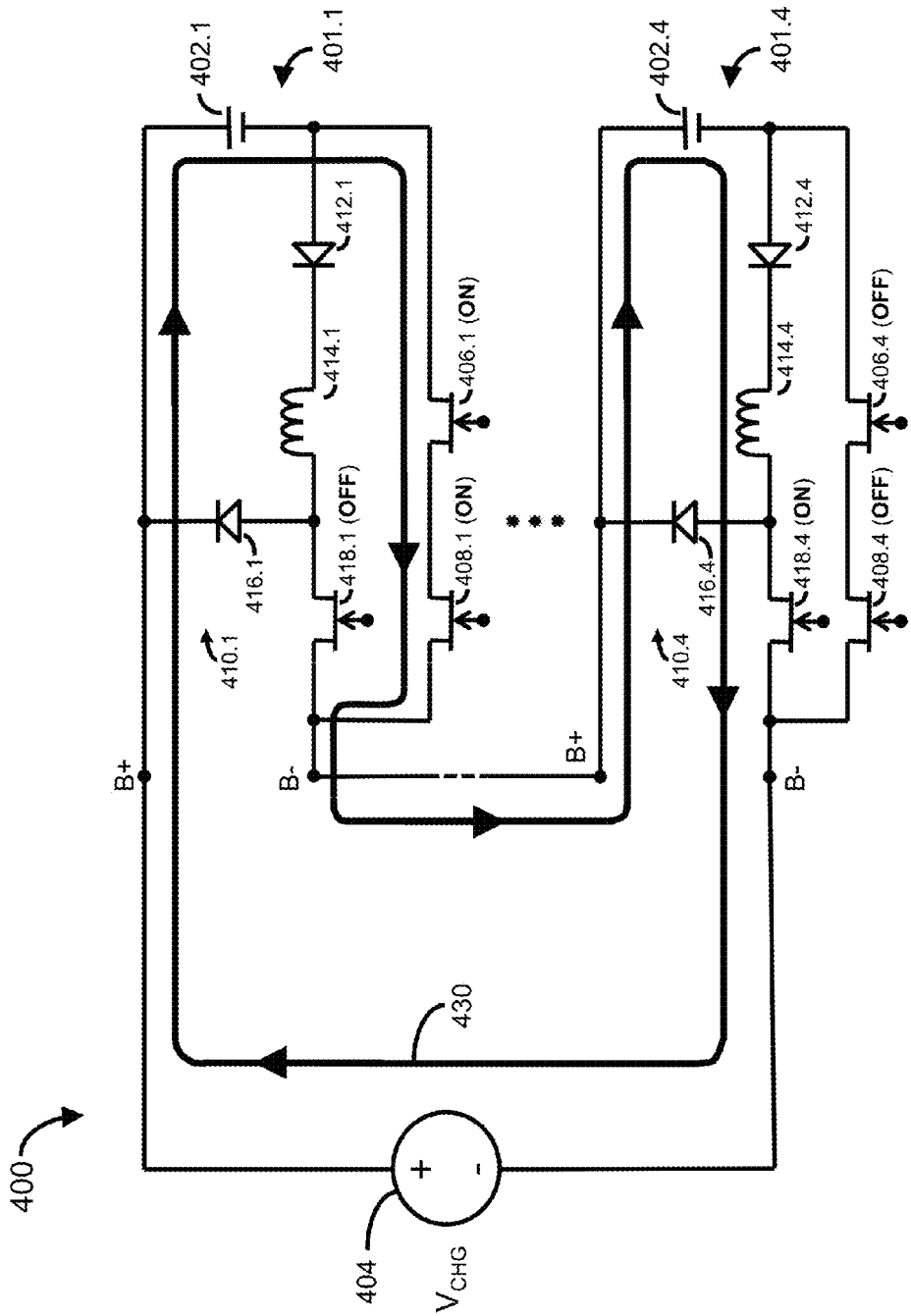

Further in this example, it is determined, within the battery module 401.1, that the battery cell 402.1 has been charged to at least the UVP voltage level. As shown in FIG. 4h, the DFET and CFET switches 406.1, 408.1 within the battery module 401.1 are therefore directed to transition from their opened or "OFF" states to their closed or "ON" states, thereby providing a bypass path around the buck pre-charging circuit 410.1, including the opened (OFF) PFET switch 418.1, within the battery module 401.1. As further shown in FIG. 4h, because the DFET and CFET switches 406.1, 408.1 within the battery module 401.1 are in their closed or "ON" states, and the PFET switches 418.2, . . . , 418.4 (only the PFET switch 418.4 is shown for clarity of illustration) within the respective battery modules 401.2, . . . , 401.4 (only the battery module 401.4 is shown for clarity of illustration) are likewise in their closed or "ON" states, the pre-charge current 430 is again allowed to flow from the charging voltage source ($V_{CHG}$) 404, successively through the series of connected battery modules 401.1, . . . , 401.4, and ultimately back to the charging voltage source ($V_{CHG}$) 404.

Figure 4I:
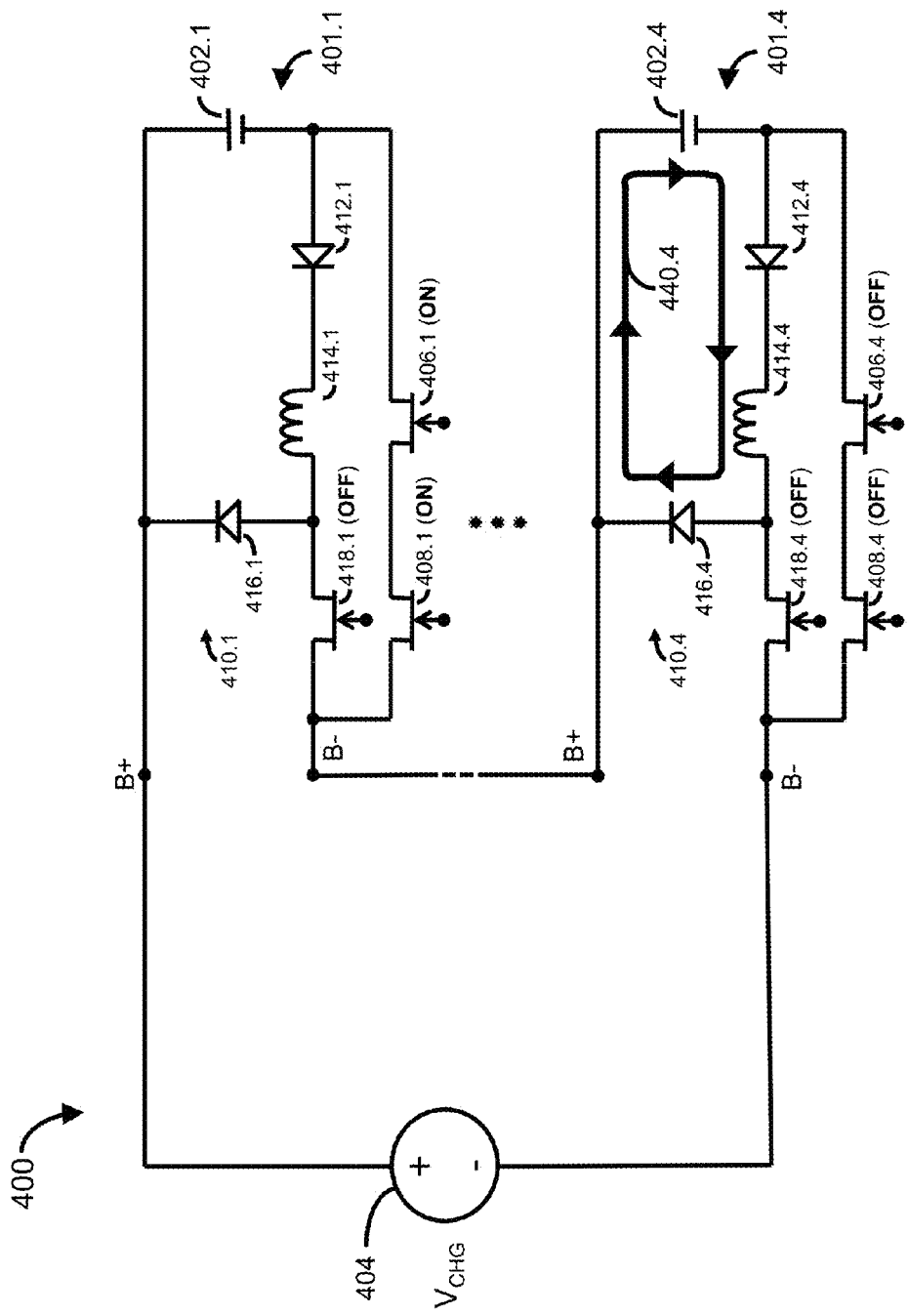

In this example, it is determined, within the battery module 401.4, that the pre-charge current 430 has ramped up to the first threshold current value, $I_{U\_THR}$. The PFET switch 418.4 within the battery module 401.4 is therefore directed to transition from its closed or "ON" state to its opened or "OFF" state (see FIG. 4i). As shown in FIG. 4i, once the PFET switch 418.4 within the battery module 401.4 has transitioned to its opened or "OFF" state, the flow of the pre-charge current 430 is interrupted, and a plurality of flyback currents 440.2, . . . , 440.4 (only the flyback current 440.4 is shown for clarity of illustration) are caused to flow within the battery modules 401.2, . . . , 401.4, respectively. It is noted that, because the DFET and CFET switches 406.1, 408.1 within the battery module 401.1 are in their closed or "ON" states, providing the bypass path around the buck pre-charging circuit 410.1, no flyback current is caused to flow within the battery module 401.1.

Figure 4J:
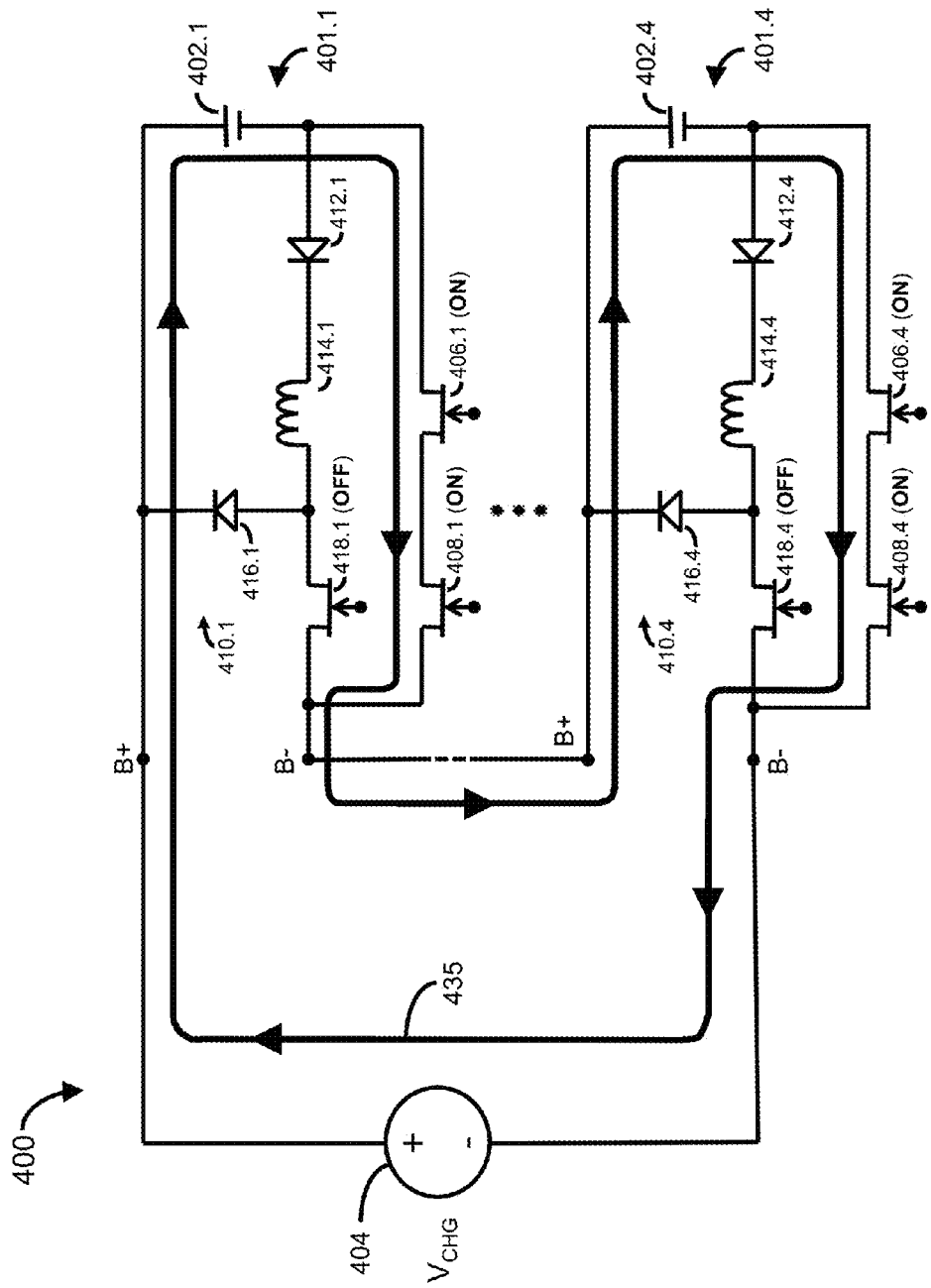
Figure 5:
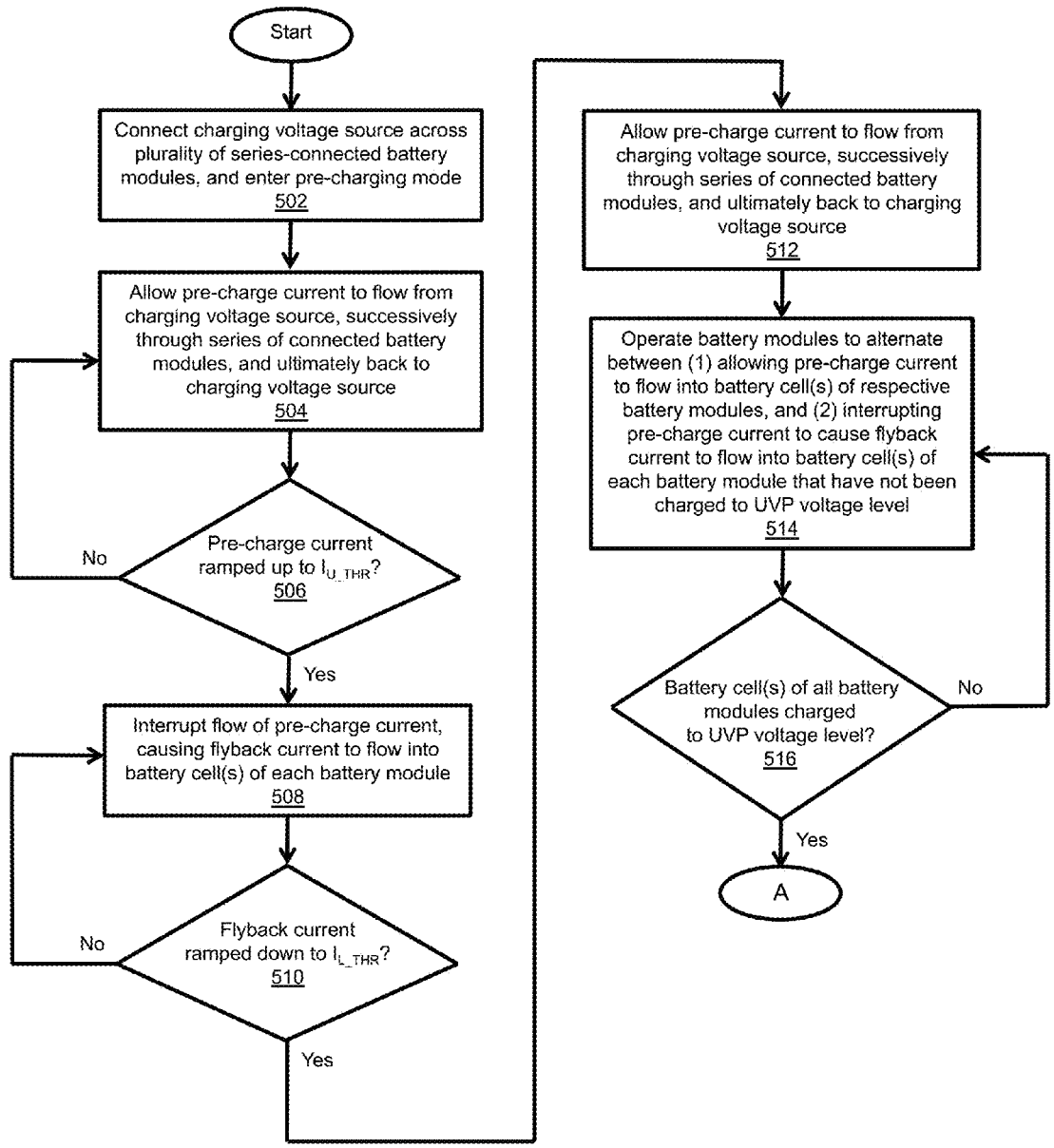
FIG. 5 is a flow diagram illustrating an exemplary method of pre-charging the plurality of series-connected battery modules of FIG. 1.
Figure 5:
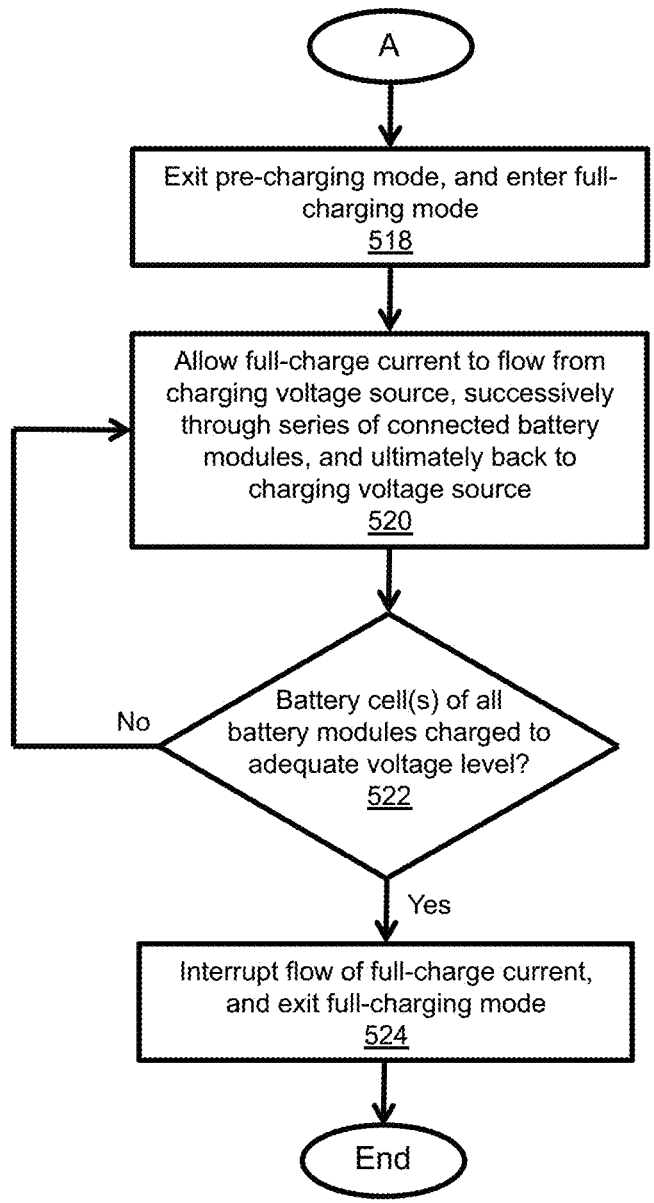

Further in this example, it is determined, within the battery modules 401.2, . . . 401.4, that the battery cells 402.2, . . . , 402.4 have all been charged to at least the UVP voltage level, allowing the system 400 to exit the pre-charging mode, and to enter the full-charging mode. As shown in FIG. 4j, the DFET switches 406.2, . . . , 406.4 (only the DFET switch 406.4 is shown for clarity of illustration) and the CFET switches 408.2, . . . , 408.4 (only the CFET switch 408.4 is shown for clarity of illustration) within the respective battery modules 401.2, . . . , 401.4 are directed to transition from their opened or "OFF" states to their closed or "ON" states, thereby providing bypass paths around the buck pre-charging circuits 410.2, . . . , 410.4 (only the buck pre-charging circuit 410.4 is shown for clarity of illustration) within the respective battery modules 401.2, . . . , 401.4. As further shown in FIG. 4j, because the DFET switches 406.1, . . . , 406.4 and CFET switches 408.1, . . . , 408.4 within the respective battery modules 401.1, . . . , 401.4 are in their closed or "ON" states, a full-charge current 435 can be allowed to flow from the charging voltage source ($V_{CHG}$) 404, successively through the series of connected battery modules 401.1, . . . , 401.4, and ultimately back to the charging voltage source ($V_{CHG}$) 404.

An exemplary method of pre-charging a plurality of series-connected battery modules is described below with reference to FIGS. 1, 3a, 3b, and 5. As depicted in block 502 (see FIG. 5), the charging voltage source ($V_{CHG}$) 104 (see FIG. 1) is connected across the plurality of series-connected battery modules 101.1, 101.2, . . . , 101.n, and the pre-charging mode is entered. As depicted in block 504, a pre-charge current is allowed to flow from the charging voltage source ($V_{CHG}$) 104, successively through the series of connected battery modules 101.1, 101.2, . . . , 101.n, and ultimately back to the charging voltage source ($V_{CHG}$) 104. As depicted in block 506, a determination is made as to whether the pre-charge current has ramped up to the first threshold current value, $I_{U\_THR}$ (see FIGS. 3a and 3b). As depicted in block 508, in the event the pre-charge current has ramped up to the first threshold current value, $I_{U\_THR}$, the flow of the pre-charge current is interrupted, causing a flyback current to flow into the battery cell(s) of each battery module 101.1, 101.2, . . . , 101.n. As depicted in block 510, a determination is made as to whether the flyback current within at least one of the battery modules 101.1, 101.2, . . . , 101.n has ramped down to the second threshold current value. $I_{L\_THR}$ (see FIGS. 3a and 3b). As depicted in block 512, in the event the flyback current within at least one of the battery modules 101.1, 101.2, . . . , 101.n has ramped down to the second threshold current value, $I_{L\_THR}$, the pre-charge current is again allowed to flow from the charging voltage source ($V_{CHG}$) 104, successively through the series of connected battery modules 101.1, 101.2, . . . , 101.n, and ultimately back to the charging voltage source ($V_{CHG}$) 104. As depicted in block 514, the battery modules 101.1, 101.2, . . . , 101.n are operated to alternate between (1) allowing the pre-charge current to flow into the battery cell(s) of the respective battery modules 101.1, 101.2, . . . , 101.n, and (2) interrupting the pre-charge current to cause a flyback current to flow into the battery cell(s) of each battery module 101.1, 101.2, . . . , 101.n that have not been charged to the UVP voltage level. As depicted in block 516, a determination is made as to whether the battery cell(s) of all of the battery modules 101.1, 101.2, . . . , 101.n have been charged to the UVP voltage level. As depicted in block 518, in the event the battery cell(s) of all of the battery modules 101.1, 101.2, . . . , 101.n have been charged to the UVP voltage level, the pre-charging mode is exited, and the full-charging mode is entered. As depicted in block 520, a full-charge current is allowed to flow from the charging voltage source ($V_{CHG}$) 104, successively through the series of connected battery modules 101.1, 101.2, . . . , 101.n, and ultimately back to the charging voltage source ($V_{CHG}$) 104. As depicted in block 522, a determination is made as to whether the battery cell(s) of all of the battery modules 101.1, 101.2, . . . , 101.n have been charged to at least the adequate voltage level, $V_{ADEQ}$ (see FIG. 3a). As depicted in block 524, in the event the battery cell(s) of all of the battery modules 101.1, 101.2, . . . , 101.n have been charged to the adequate voltage level, $V_{ADEQ}$, the flow of the full-charge current is interrupted, and the full-charging mode is exited.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of pre-charging a plurality of series-connected battery modules, each battery module having one or more rechargeable battery cells, the method comprising:

connecting a charging voltage source across the plurality of series-connected battery modules to cause a pre-charge current to flow in a pre-charge current path into the battery cells of the respective series-connected battery modules, each battery module having a buck pre-charging circuit including an inductor, the pre-charge current path at least initially passing through the inductor included in the buck pre-charging circuit of each battery module in order to allow the pre-charge current to induce a magnetic field within the inductor included in the buck pre-charging circuit of the battery module;

in an interrupting step, once the pre-charge current has ramped up to a first threshold current value, interrupting the pre-charge current to initiate a collapse of the magnetic field within the inductor included in the buck pre-charging circuit of one or more of the plurality of series-connected battery modules, thereby causing one or more flyback currents to flow within the one or more series-connected battery modules, respectively, each flyback current flowing in a flyback current path that passes through the inductor included in the buck pre-charging circuit of a respective one of the one or more series-connected battery modules, the flyback current flowing from the inductor into the battery cells of the respective one of the one or more series-connected battery modules;

in an allowing step, once the flyback current within at least one of the one or more series-connected battery modules has ramped down to a second threshold current value, allowing the pre-charge current to flow in the pre-charge current path into the battery cells of the respective series-connected battery modules;

alternating between the interrupting step and the allowing step until the battery cells within each of the plurality of series-connected battery modules have been charged to at least a minimum voltage level needed for operation; and once the battery cells within each of the plurality of series-connected battery modules have been charged to at least the minimum voltage level needed for operation, causing, by the charging voltage source connected across the plurality of series-connected battery modules, a full-charge current to flow into the battery cells of the respective series-connected battery modules.

2. The method of claim 1 further comprising:

once the battery cells within a respective battery module among the plurality of series-connected battery modules have been charged to at least the minimum voltage level needed for operation, configuring the pre-charge current path to bypass around the buck pre-charging circuit within the respective battery module.

3. The method of claim 1 further comprising:

once the battery cells within each of the plurality of series-connected battery modules are adequately charged based at least on a voltage level of the battery cells, interrupting the full-charge current.

4. A system for pre-charging a plurality of series-connected battery modules, comprising:

a plurality of battery modules arranged in a series-connected configuration, each of the plurality of battery modules including one or more rechargeable battery cells, a buck pre-charging circuit, a charge switch, a current sense resistor, and a battery manager, the buck pre-charging circuit including a pre-charge switch and an inductor; and a charging voltage source connected across the plurality of battery modules to cause a pre-charge current to flow in a pre-charge current path into the battery cells of the respective battery modules, the pre-charge current path passing through the battery cells and at least initially passing through the pre-charge switch and the inductor included in the buck pre-charging circuit of each battery module in order to induce a magnetic field within the inductor included in the buck pre-charging circuit of the battery module, wherein, within each battery module, the battery manager is operative (1) to open the charge switch and to close the pre-charge switch to allow the pre-charge current to flow in the pre-charge current path, thereby charging the battery cells of the respective battery modules and inducing the magnetic field within the inductor included in the buck pre-charge circuit of one or more of the plurality of battery modules, and (2) to monitor a value of the pre-charge current and a voltage level of the battery cells within the battery module, wherein, within at least one of the respective battery modules, once the pre-charge current has ramped up to a first threshold current value, the battery manager is further operative to open the pre-charge switch to interrupt the pre-charge current, thereby initiating a collapse of the magnetic field within the inductor included in the buck pre-charging circuit of the one or more battery modules and causing one or more flyback currents to flow within the one or more battery modules, respectively, each flyback current flowing in a flyback current path that passes through the inductor included in the buck pre-charging circuit of a respective one of the one or more battery modules, the flyback current flowing from the inductor into the battery cells of the respective one of the one or more battery modules, wherein, within at least one of the respective battery modules, once the flyback current has ramped down to a second threshold current value, the battery manager is further operative to close the pre-charge switch to allow the pre-charge current to flow in the pre-charge current path into the battery cells of the respective battery modules, and wherein, within at least one of the respective battery modules, the battery manager is further operative to alternate between (1) closing the pre-charge switch to allow the pre-charge current to flow in the pre-charge current path into the battery cells of the respective battery modules, and (2) opening the pre-charge switch to interrupt the pre-charge current and to cause a flyback current to flow in the flyback current path from the inductor into the battery cells of each battery module that have not been charged to a minimum voltage level needed for operation, until the battery cells within each of the plurality of battery modules have been charged to at least the minimum voltage level needed for operation.

5. The system of claim 4 wherein, once the battery cells within a respective battery module among the plurality of battery modules have been charged to at least the minimum voltage level needed for operation, the battery manager within the respective battery module is further operative to close the charge switch, thereby configuring the pre-charge current path to bypass around the buck pre-charging circuit within the respective battery module.

6. The system of claim 5 wherein, once the battery cells within each of the plurality of battery modules have been charged to at least the minimum voltage level needed for operation, the charging voltage source is further connected across the plurality of series-connected battery modules to cause a full-charge current to flow in a full-charge current path that bypasses around the buck pre-charging circuit within each battery module and flows through the battery cells of the respective battery modules, the full-charge current being operative to charge the battery cells of the respective battery modules.

7. The system of claim 6 wherein, once the battery cells within each battery module are adequately charged based at least on the voltage level of the battery cells, the battery manager within the respective battery module is further operative to open the charge switch to interrupt the full-charge current.

8. The system of claim 4 wherein each of the rechargeable battery cells is one of a nickel-metal-hydride (NiMH) battery cell, and a lithium-ion (Li-ion) battery cell.

9. The system of claim 4 wherein at least one of the charge switch and the pre-charge switch is one of a relay, a contactor, an insulated gate bipolar transistor (IGBT), a metal-oxide substrate field effect transistor (MOSFET), a bipolar junction transistor (BJT), a silicon controlled rectifier (SCR).

10. The system of claim 4 wherein, within each battery module, the buck pre-charging circuit further includes a blocking diode connected between the inductor and a negative terminal of the battery cells.

11. The system of claim 10 wherein, within each battery module, the buck pre-charging circuit further includes a flyback diode connected between the inductor and a positive terminal of the battery cells.

12. The system of claim 4 wherein, within each battery module, the battery manager includes a programmable microcontroller, and one or more of a program memory and a data memory.

13. The system of claim 12 wherein, within each battery module, the battery manager further includes battery cell voltage detection circuitry operative to monitor the voltage level of the battery cells.

14. The system of claim 13 wherein, within each battery module, the current sense resistor is connected between the inductor and the negative terminal of the battery cells.

15. The system of claim 14 wherein, within each battery module, the battery manager further includes a current sensor operative to monitor the value of the pre-charge current flowing through the current sense resistor.

16. The system of claim 15 wherein, within each battery module, the battery manager further includes an analog-todigital converter operative to receive, in analog form, the voltage level of the battery cells, and to provide, in digital form, the voltage level of the battery cells to the microcontroller.

17. The system of claim 16 wherein the analog-to-digital converter is further operative to receive, in analog form, the value of the pre-charge current, and to provide, in digital form, the value of the pre-charge current to the microcontroller.

18. A battery module, comprising:
one or more rechargeable battery cells, a buck pre-charging circuit, a charge switch, a current sense resistor, and a battery manager, the buck pre-charging circuit including a pre-charge switch and an inductor,
wherein the battery manager is operative (1) to open the charge switch and to close the pre-charge switch to allow a pre-charge current to flow in a pre-charge current path that passes through the battery cells and at least initially passes through the pre-charge switch and the inductor, thereby inducing a magnetic field within the inductor while charging the battery cells, and (2) to monitor a value of the pre-charge current and a voltage level of the battery cells, and wherein the battery manager is further operative, in alternating fashion until the battery cells have been charged to at least a minimum voltage level needed for operation:
once the pre-charge current has ramped up to a first threshold current value, to open the pre-charge switch to interrupt the pre-charge current, thereby initiating a collapse of the magnetic field within the inductor and causing a flyback current to flow in a flyback current path that passes through the inductor, the flyback current flowing from the inductor into the battery cells; and
once the flyback current has ramped down to a second threshold current value, to close the pre-charge switch to allow the pre-charge current to flow in the pre-charge current path into the battery cells.

19. The battery module of claim 18 wherein the buck pre-charging circuit further includes a blocking diode connected between the inductor and a negative terminal of the battery cells.

20. The battery module of claim 19 wherein the buck pre-charging circuit further includes a flyback diode connected between the inductor and a positive terminal of the battery cells.

* * * * *